(12) United States Patent
Kikuchi et al.

(10) Patent No.: US 10,309,804 B2
(45) Date of Patent: Jun. 4, 2019

(54) ENCODER SIGNAL PROCESSOR HAVING AUTOMATIC ADJUSTMENT FUNCTION

(71) Applicant: FANUC CORPORATION, Minamitsuru-gun, Yamanashi (JP)

(72) Inventors: Hirofumi Kikuchi, Yamanashi (JP); Takurou Hayashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 239 days.

(21) Appl. No.: 15/053,198

(22) Filed: Feb. 25, 2016

(65) Prior Publication Data

US 2016/0252375 A1 Sep. 1, 2016

(30) Foreign Application Priority Data

Feb. 27, 2015 (JP) ................................. 2015-038953

(51) Int. Cl.
*G01D 5/244* (2006.01)

(52) U.S. Cl.
CPC .............. *G01D 5/24495* (2013.01)

(58) Field of Classification Search
CPC ...... G01D 18/00; G01D 5/14; G01D 5/24495; G01D 5/24476; G01D 5/24409; H03M 1/12; H03F 3/217; H04R 1/005; H04R 3/08; H04R 9/045; H04R 2209/041
USPC .................... 702/94, 117; 318/638, 117, 120
See application file for complete search history.

(56) References Cited

U.S. PATENT DOCUMENTS

| | | | |
|---|---|---|---|
| 6,597,747 B1 * | 7/2003 | Azuma | H04L 27/0014 327/238 |
| 8,836,255 B2 | 9/2014 | Nishimura et al. | |
| 2006/0247884 A1 * | 11/2006 | Atsuta | G01D 5/24409 702/117 |

(Continued)

FOREIGN PATENT DOCUMENTS

| | | |
|---|---|---|
| JP | S63154916 A | 6/1988 |
| JP | 2000230840 A | 8/2000 |

(Continued)

OTHER PUBLICATIONS

Japanese Notice of Reasons for Refusal for Japanese Application No. 2015-038953, dated Mar. 6, 2017, including English translation, 4 pages.

*Primary Examiner* — Mouloucoulaye Inoussa
(74) *Attorney, Agent, or Firm* — RatnerPrestia

(57) ABSTRACT

An encoder signal processor comprises an analog signal adjustment circuit for adjusting, based on an adjusting signal, at least one of an offset and an amplitude of a sinusoidal analog signal with two phases having a 90-degree difference outputted in accordance with a travel of a target to be measured, a position detection circuit for calculating position data of a target to be measured based on a digital signal obtained through analog/digital conversion of an analog signal adjusted, a velocity change amount detection circuit for detecting a change amount of velocity per predetermined detection cycle from a velocity calculated based on position data outputted while a target to be measured is traveling at a constant velocity, and an adjusting signal generation circuit for generating an adjusting signal that minimizes the change amount of velocity detected and transmitting the adjusting signal to the analog signal adjustment circuit.

11 Claims, 20 Drawing Sheets

(56) References Cited

U.S. PATENT DOCUMENTS

2010/0188031 A1\* 7/2010 Shimizu .................... H02P 1/52
318/400.11
2013/0026965 A1\* 1/2013 Yoshitake .......... G01D 5/24476
318/638

FOREIGN PATENT DOCUMENTS

| JP | 2003-254785 A | 9/2003 |
| JP | 2011196904 A | 10/2011 |
| JP | 2012125106 A | 6/2012 |

\* cited by examiner

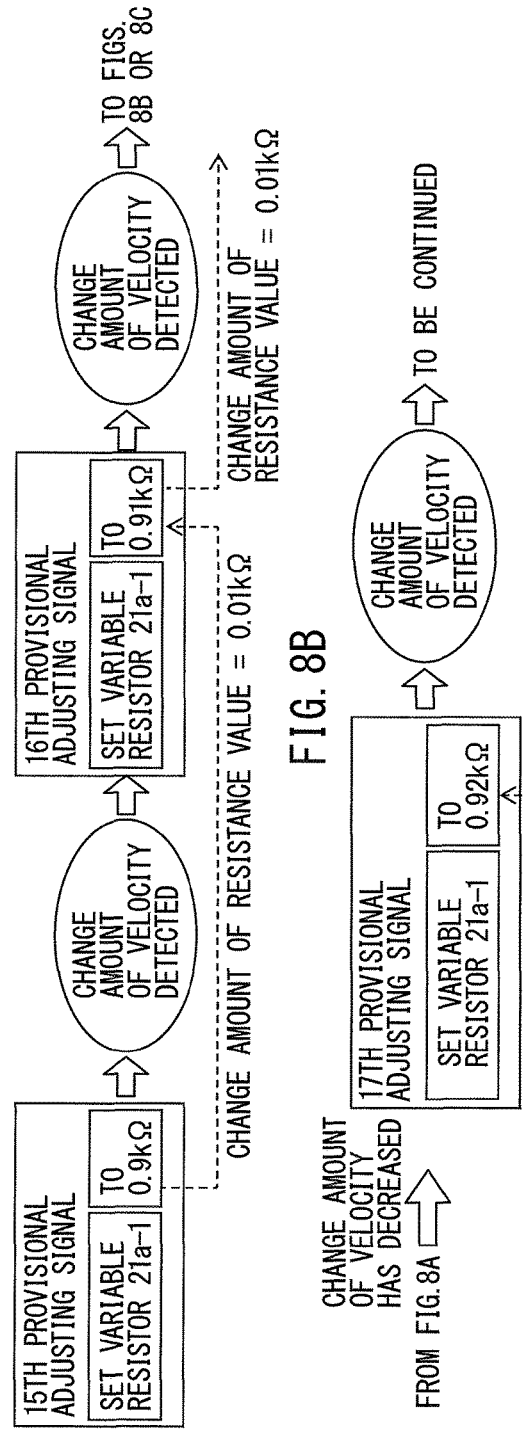

FIG. 11A
FIG. 11B
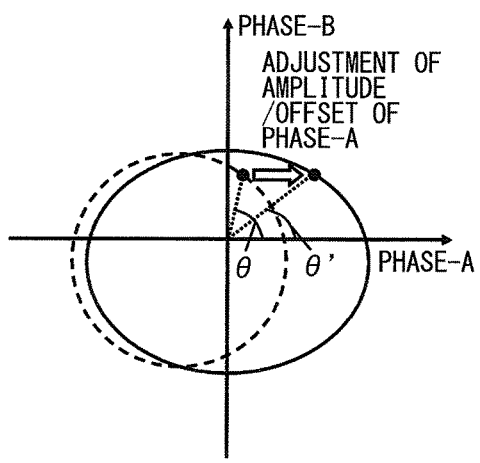
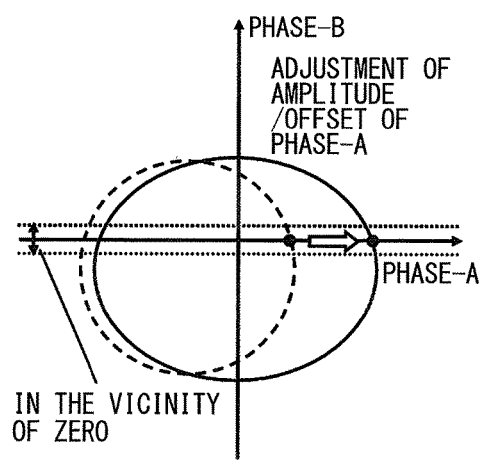

ENCODER SIGNAL PROCESSOR HAVING AUTOMATIC ADJUSTMENT FUNCTION

BACKGROUND OF THE INVENTION

1. Field of the Invention

The present invention relates to an encoder signal processor for calculating the position data of a target to be measured based on a sinusoidal analog signal with two phases having a 90-degree difference outputted in accordance with a travel of the target to be measured.

2. Description of the Related Art

It has been a common practice to adjust, inside an encoder for detecting the position of a traveling object to be measured, a signal to be processed in the encoder in order to attain high-accuracy position detection.

FIG. 20 illustrates a block diagram of a general-purpose encoder signal processor. Typically, an encoder 101 includes a sensing unit 40, an analog signal adjustment circuit 50 configured as an analog circuit, and a position detection circuit 60 configured as a digital circuit. The sensing unit 40 outputs a sinusoidal analog signal with two phases, Phase-A and Phase-B, having a 90-degree difference, in accordance with a travel of a target to be measured. The analog signal is transmitted via the analog signal adjustment circuit 50 to analog/digital (A/D) converter circuits 53a and 53b, and converted to a digital signal therein. The digital signal is then used by the position detection circuit 60 to detect position data.

The analog signal adjustment circuit 50 is designed to perform magnification power adjustment and offset adjustment while being incorporated into an encoder in the manufacturing process in order to attain high-accuracy position detection. The analog signal adjustment circuit 50 includes variable resistors 51a and 51b and analog signal processor unit 52a and 52b corresponding to the phases of a two-phase signal. A mechanical volume knob is coupled to each of the variable resistors 51a and 51b in the encoder in order to alter the resistance value of each of the variable resistors 51a and 51b. Analog signal adjustment procedure in the manufacturing process of the encoder 101 includes the steps of: 1) Inputting one or the other phase of a two-phase analog signal to the corresponding variable resistor 51a or 51b; 2) Measuring an amplitude and an offset of the two-phase analog signal outputted from the analog signal processor unit 52a and 52b by the use of an external measurement apparatus; 3) Opening the cover of the encoder; 4) Turning the mechanical volume knob to adjust the resistance value of each of the variable resistors 51a and 51b to maintain the amplitude and offset values within a specified range. The procedure aims to improve position detection accuracy of the encoder 101.

As described in the Japanese Unexamined Patent Publication No. 2003-254785, an analog signal may be converted to a digital signal and then undergo removal of an offset voltage, an amplitude difference, a phase difference and waveform distortion by way of digital signal processing to attain higher-accuracy position detection. FIG. 21 is a block diagram illustrating an encoder signal processor disclosed in the Japanese Unexamined Patent Publication No. 2003-254785. A digital circuit of the encoder 101 is provided with a position correction circuit 61, which directly applies a correction formula to the position data in digital format detected by a position detection circuit 54 to improve the position detection accuracy of the encoder 101.

As described above, there have been analog signal adjustments based on the measurement result of an analog signal, hereinafter referred to simply as the analog signal adjustment, and digital signal adjustment that is based on a digital signal produced by analog/digital conversion in order to attain high-accuracy position detection with an encoder.

However, analog signal adjustment in the manufacturing process alone cannot adequately address a drop in the amplitude or a change in the offset of an analog signal outputted from a sensing unit caused by secular changes of an encoder. Under such circumstances, it may be necessary to temporality stop ordinary use of an encoder while performing analog signal adjustment. Analog signal adjustment may be difficult depending on the encoder mounting position. The above digital signal adjustment may perform correction based on the position data detected by the position detection circuit without considering a drop in the amplitude or a change in the offset of an analog signal caused by secular changes of an encoder. This may result in insufficient correction.

SUMMARY OF THE INVENTION

In light of the above problems, an object of the invention is to provide an encoder signal processor capable of performing high-accuracy position detection while addressing secular changes of the encoder outputting an analog signal waveform.

To achieve the object, an encoder signal processor includes, an analog signal adjustment circuit for adjusting, based on an adjusting signal received, at least one of an offset and an amplitude of a sinusoidal analog signal with two phases having a 90-degree difference outputted in accordance with a travel of a target to be measured, a position detection circuit for calculating position data of a target to be measured based on a digital signal obtained through analog/digital conversion of an analog signal adjusted by the analog signal adjustment circuit, a velocity change amount detection circuit for detecting a change amount of velocity per predetermined detection cycle from a velocity calculated based on position data outputted from the position detection circuit while a target to be measured is traveling at a constant velocity, and an adjusting signal generation circuit for generating an adjusting signal that minimizes the change amount of velocity detected by the velocity change amount detection circuit and transmitting the adjusting signal to the analog signal adjustment circuit.

The analog signal adjustment circuit includes variable resistors each having a resistance value that is adjusted to converge to a resistance value specified by an adjusting signal or a provisional adjusting signal received. In conjunction with the adjustment of the resistance value of a variable resistor, there is adjusted at least one of an offset and an amplitude of a sinusoidal analog signal with two phases having a 90-degree difference.

The variable resistors are individually provided to adjust each of an offset and amplitude of a single-phase sinusoidal analog signal with one of the two phases having a 90-degree difference of a two-phase sinusoidal analog signal. The adjusting signal and the provisional adjusting signal specify the variable resistors to be adjusted and the target resistance value of the variable resistors.

The adjusting signal generation circuit includes: a velocity change amount comparison unit for comparing a change amount of velocity detected by the velocity change amount detection circuit with a change amount of velocity detected in a first preceding detection cycle of detection of the change amount of velocity, a provisional adjusting signal determination unit for determining a provisional adjusting signal based on the change amount of velocity detected by the velocity change amount detection circuit in the detection cycle and transmitting the provisional adjusting signal to the analog signal adjustment circuit, wherein when the velocity change amount comparison unit has determined that the change amount of velocity detected by the velocity change amount detection circuit is smaller than the change amount of velocity detected in a first preceding detection cycle, the provisional adjusting signal determination unit adds the same shift amount as that used for determination of the provisional adjusting signal in the first preceding detection cycle to a resistance value specified by the provisional adjusting signal in the first preceding detection cycle and transmits the resulting signal as a provisional adjusting signal in the current detection cycle to the analog signal adjustment circuit, and wherein when the velocity change amount comparison unit has determined that the change amount of velocity detected by the velocity change amount detection circuit is larger than the change amount of velocity detected in a first preceding detection cycle, the provisional adjusting signal determination unit subtracts the same shift amount as that used for determination of the provisional adjusting signal in the first preceding detection cycle from the resistance value specified by the provisional adjusting signal in the first preceding detection cycle, adds a shift amount different from the shift amount and transmits the resulting signal as a provisional adjusting signal in the current detection cycle to the analog signal adjustment circuit, or transmits a provisional adjusting signal in which the variable resistor to be adjusted is changed to the analog signal adjustment circuit; and an adjustment signal confirmation unit for confirming as an adjusting signal a provisional adjusting signal transmitted from the provisional adjusting signal determination unit to the analog signal adjustment circuit when the change amount of velocity detected by the velocity change amount detection circuit has converged to a predetermined value.

The encoder signal processor further includes a storage circuit including a first storage area for storing a set of the change amount of velocity and the provisional adjusting signal transmitted to the analog signal adjustment circuit when the change amount of velocity was detected, and a second storage area for storing a predefined provisional adjusting signal as a candidate to be transmitted to the analog signal adjustment circuit. The velocity change amount comparison unit compares the change amount of velocity detected by the velocity change amount detection circuit with the change amount of velocity stored in the first storage area, the change amount of velocity detected in a first preceding detection cycle of detection of the change amount of velocity. When the velocity change amount comparison unit has determined that the change amount of velocity detected by the velocity change amount detection circuit is smaller than the change amount of velocity detected in the first preceding detection cycle, the provisional adjusting signal determination unit transmits to the analog signal adjustment circuit a provisional adjusting signal stored in the second storage area specifying the resistance value adjusted by the same change amount as that of the resistance value between the provisional adjusting signal in a second preceding detection cycle and the provisional adjusting signal in the first preceding detection cycle stored in the first storage area. When the velocity change amount comparison unit has determined that the change amount of velocity detected by the velocity change amount detection circuit is larger than the change amount of velocity detected in the first preceding detection cycle, the provisional adjusting signal determination unit transmits to the analog signal adjustment circuit a provisional adjusting signal in the second storage area specifying a change amount different from the change amount of the resistance value between the provisional adjusting signal in a second preceding detection cycle and the provisional adjusting signal in the first preceding detection cycle stored in the first storage area.

When the amplitude of an analog signal with one of the two phases having a 90-degree difference of a two-phase sinusoidal analog signal is in the vicinity of zero, the adjusting signal generation circuit may generate a provisional adjusting signal for adjusting at least one of an offset and an amplitude of an analog signal with the other phase and transmit the provisional adjusting signal to the analog signal adjustment circuit.

The encoder signal processor may further include a command circuit for commanding the adjusting signal generation circuit to stop generation of an adjusting signal when the change amount of velocity detected by the velocity change amount detection circuit is smaller than a first predefined threshold, and for commanding the adjusting signal generation circuit to start generation of an adjusting signal when the change amount of velocity detected by the velocity change amount detection circuit is larger than a second threshold exceeding the first predefined threshold.

The command circuit may command the adjusting signal generation circuit to start generation of an adjusting signal when the change amount of velocity detected by the velocity change amount detection circuit is larger than the first threshold and an adjusting start signal is received from the outside or when the change amount of velocity detected by the velocity change amount detection circuit is larger than the second threshold.

The encoder signal processor may include: a monitoring unit for monitoring whether a monitoring target value as at least one of an offset and an amplitude of an analog signal adjusted by the analog signal adjustment circuit drops below a predefined third threshold or exceeds a fourth threshold that is larger than the third threshold, in a time interval after a command to start generation of an adjusting signal is received from the command circuit until the adjusting signal generation circuit is commanded to start generation of an adjusting signal; a preadjustment unit for transmitting to the variable resistor a signal for adjusting the resistance value by a predetermined amount to cause the monitoring target value to increase until the monitoring target value exceeds the third threshold when the monitoring target value has dropped below the third threshold and for transmitting to the variable resistor a signal for adjusting the resistance value by a predetermined amount to cause the monitoring target value to decrease until it drops below the fourth threshold when the monitoring target value has exceeded the fourth threshold; and a setting unit for setting, as a new predetermined amount used by the preadjustment unit, a value smaller than the predetermined amount used to adjust the monitoring target value each time the monitoring target value has dropped below the third threshold or has exceeded the fourth threshold; wherein the command circuit may command starting generation of an adjusting signal when the monitoring target value has settled between the third threshold and the fourth threshold.

The velocity change amount detection circuit may include: a velocity calculation unit for calculating a velocity V(m) based on $$V(m) = \frac{X(m) - X(m-1)}{\Delta t} \quad (1)$$

an acceleration calculation unit for calculating an acceleration A(m) based on $$A(m) = \frac{V(m) - V(m-1)}{\Delta t} \quad (2)$$

given that, while a target to be measured is traveling at a constant velocity, the position of the target to be measured as detected by a position detection circuit with a certain detection timing m is X(m), the position of the target to be measured as detected with a detection timing m−1 immediately preceding the detection timing is X(m−1), and a position detection cycle is Δt; and a change amount calculation unit for calculating a change amount of velocity $D_A$ based on $$D_A = \sum_{k=p}^{q} |A(k)| \quad (3)$$

where p≤q, given that detection timings for defining a predetermined detection cycle larger than the position detection cycle Δt are p and q (where p≤q).

The predetermined detection cycle may be an integral multiple of the cycle of a sinusoidal analog signal with two phases having a 90-degree difference.

BRIEF DESCRIPTION OF THE DRAWINGS

The invention will be more clearly understood by reference to the accompanying drawings, in which:

FIGS. 8A to 8C explain the provisional adjusting signal determination processes by a provisional adjusting signal determination circuit in the encoder signal processor according to the first example.

FIGS. 11A and 11B are Lissajous diagrams each explaining a variant of generation of the provisional adjusting signal by the adjusting signal generation circuit in the encoder signal processor according to the first example.

DETAILED DESCRIPTION

The encoder signal processor having an automatic adjustment function will be described with reference to the drawings. It is to be understood that the invention is not limited to the drawings or examples given below.

Figure 1:
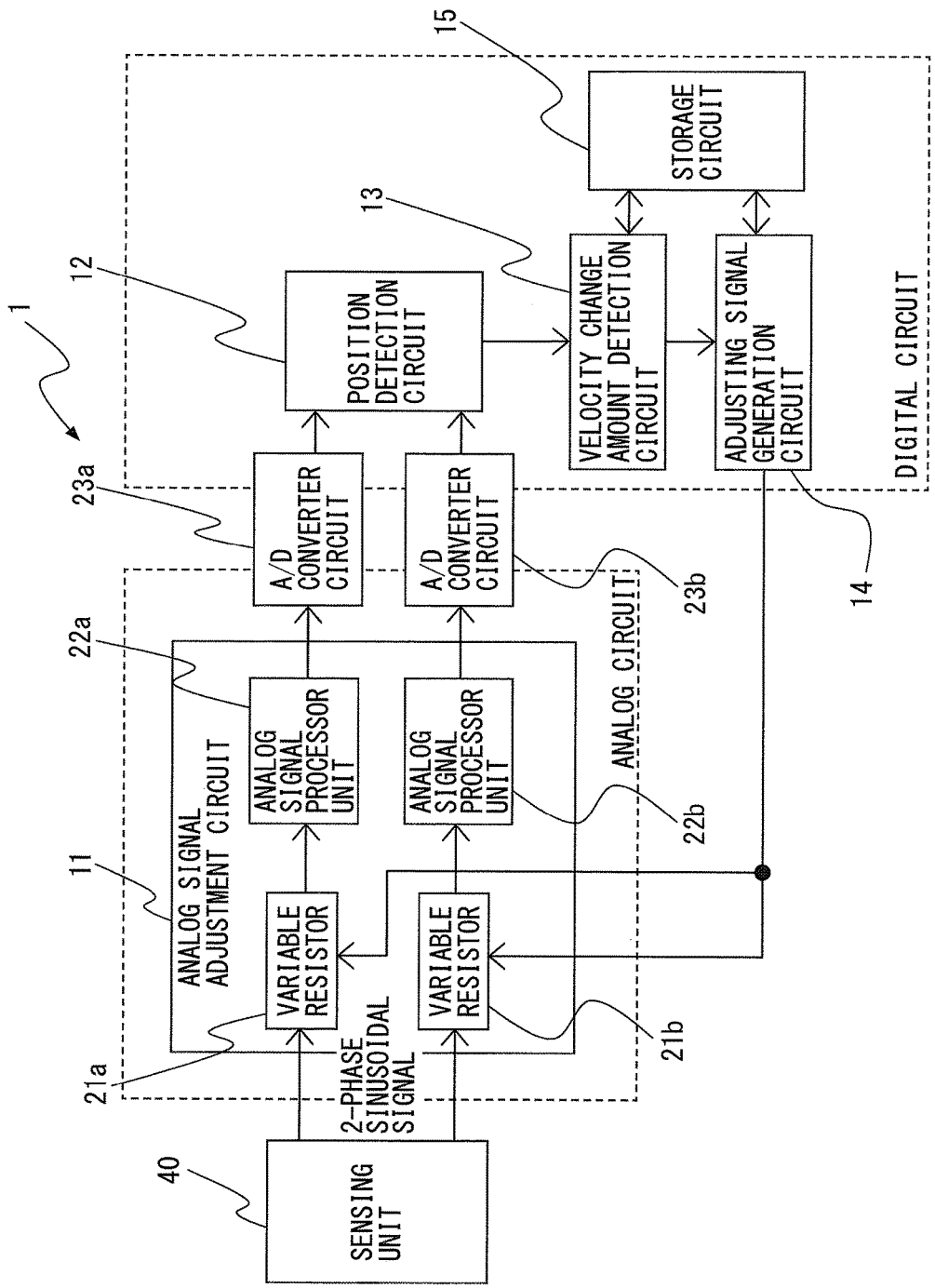
FIG. 1 is a principle block diagram of an encoder signal processor according to a first example.

FIG. 1 is a principle block diagram of an encoder signal processor according to a first example. In the description that follows, components assigned the same reference sign indicate those having the same function.

An encoder signal processor 1 according to a first example includes an analog signal adjustment circuit 11, a position detection circuit 12, a velocity change amount detection circuit 13, an adjusting signal generation circuit 14, and a storage circuit 15. The analog signal adjustment circuit 11 is configured as an analog circuit for performing arithmetic processing of analog signals. The position detection circuit 12, the velocity change amount detection circuit 13, the adjusting signal generation circuit 14, and the storage circuit 15 are configured as digital circuits for performing arithmetic processing of digital signals. The digital circuits may be implemented in a software program format or via a combination of one of a variety of digital electronic circuits and a software program. When implemented in a software program format, the position detection circuit 12, the velocity change amount detection circuit 13, the adjusting signal generation circuit 14, and the storage circuit 15 operate in accordance with the software program to provide individual functions.

The encoder signal processor 1 includes analog/digital (A/D) converter circuits 23a and 23b between the analog signal adjustment circuit 11 and the position detection circuit 12. The A/D converter circuits 23a and 23b performs A/D conversion of an analog signal outputted from the analog signal adjustment circuit 11 and outputs the resulting digital signal. Configuration of the A/D converter circuits 23a and 23b does not limit the scope of the invention.

A sensing unit 40 is connected to the encoder signal processor 1. The sensing unit 40 senses a travel of a target to be measured and outputs a sinusoidal analog signal with two phases, Phase-A and Phase-B, having a 90-degree difference, in accordance with a travel of the target to be measured. Configuration of the sensing unit 40 does not limit the scope of the invention. The two-phase analog signal outputted from the sensing unit 40 is inputted to the analog signal adjustment circuit 11.

The analog signal adjustment circuit 11 adjusts at least one of an offset and an amplitude of a sinusoidal analog signal with two phases having a 90-degree difference outputted from the sensing unit 40 in accordance with a travel of the target to be measured, based on an adjusting signal received or a provisional adjusting signal described later. The analog signal adjustment circuit 11 includes variable resistors 21a and 21b. The resistance value of each of the variable resistors 21a and 21b is adjusted to converge to a resistance value specified by an adjusting signal or a provisional adjusting signal received from an adjusting signal generation circuit 14. In conjunction with the adjustment of the resistance value of each of the variable resistors 21a and 21b, there is adjusted at least one of an offset and an amplitude of a two-phase sinusoidal analog signal inputted from the sensing unit 40.

In this example, the variable resistors are individually provided to adjust each of an offset and an amplitude of a single-phase sinusoidal analog signal with one of the two phases having a 90-degree difference of a two-phase sinusoidal analog signal, the single-phase sinusoidal analog signal outputted from the sensing unit 40 in order to attain high-accuracy position detection. In other words, there are provided one variable resistor for adjusting an amplitude of an analog signal with Phase-A, one variable resistor for adjusting an offset of an analog signal with Phase-A, one variable resistor for adjusting an amplitude of an analog signal with Phase-B, and one variable resistor for adjusting an offset of an analog signal with Phase-B, all analog signals inputted from the sensing unit 40. In FIG. 1, for clarity, only the variable resistors 21a and 21b are provided that correspond to analog signals with Phase-A and Phase-B, respectively, instead of the above-mentioned four variable resistors.

In this example, variable resistors are individually provided to adjust the offset or amplitude of a single-phase analog signal with one of the two phases, Phase-A and Phase-B, having a 90-degree difference of a two-phase sinusoidal analog signal. The adjusting signal and the provisional adjusting signal specify a variable resistor to be adjusted and the target resistance value thereof. In other words, the adjusting signal and the provisional adjusting signal specify the identification information of a variable resistor to be adjusted and the information on the target resistance value thereof. The adjusting signal and the provisional adjusting signal will be detailed later.

An example of the variable resistor 21a or 21b is an electronic variable resistor. When electronic variable resistors are used as the variable resistors 21a and 21b, it is made easy to adjust the resistance value thereof based on the adjusting signal or provisional adjusting signal received. This approach eliminates the need for an external measurement circuit for signal measurement required for analog signal adjustment with a conventional analog variable resistor and a mechanical volume knob used to adjust the resistance value of an analog variable resistor. In other words, according to the example, adjustment of an analog signal waveform is made possible without opening the cover of an encoder, which prevents intrusion of dust or dirt into the encoder. It is possible to reduce man-hours necessary for manufacturing encoders thereby reducing the overall manufacturing cost of encoders. All components for adjusting an analog signal waveform are assembled into an encoder. This downsizes encoder manufacturing equipment.

Analog variable resistors may be used as the variable resistors 21a and 21b. The user may check the calculated adjusting signal or provisional adjusting signal on a user interface such as a display unit and then set a desired resistance value of analog variable resistors.

The position detection circuit 12 calculates the position data of a target to be measured based on a digital signal produced in the A/D conversion circuits 23a and 23b from an analog signal adjusted by the analog signal adjustment circuit 11.

The analog signal adjustment circuit 11 and the position detection circuit 12 allow the position data of a target to be measured sensed by the sensing unit 40 to be detected based on an adjusting signal confirmed by the use of the velocity change amount detection circuit 13, the adjusting signal generation circuit 14, and the storage circuit 15.

Next, generation of an adjusting signal used by the analog signal adjustment circuit 11 will be described. Generation of an adjusting signal uses the velocity change amount detection circuit 13, the adjusting signal generation circuit 14, and the storage circuit 15.

Imagine a target to be measured is sensed by the sensing unit 40. Lissajous curve of corresponding position data detected by the position detection circuit 12 has a specified amplitude in an ideal state, i.e., a state without secular changes of an encoder, and forms a true circle without a DC offset. In this example, when a change amount of velocity is calculated based on position data detected by the position detection circuit 12, the obtained change amount of velocity will be zero because the target to be measured is traveling at a constant velocity. Lissajous curve of position data detected by the position detection circuit 12 may, however, have a DC offset and a non-conforming amplitude upon any decrease in the amplitude of an analog signal outputted from the sensing unit or any change in the offset thereof caused by secular changes of an encoder. The resulting change amount of velocity takes a certain value instead of zero while the target to be measured is traveling at a constant velocity. This discrepancy may be attributable to an offset voltage, an amplitude difference, a phase difference or waveform distortion caused by secular changes of an encoder.

In the first example, a change amount of velocity is measured based on position data detected by the position detection circuit 12 while a target to be measured is traveling at a constant velocity. Then an adjusting signal is generated that will reduce the change amount of velocity to a minimum value (ideally zero). The adjusting signal thus generated is used for adjustment of an analog signal in the analog signal adjustment circuit 11 to remove the offset voltage, the amplitude difference, the phase difference and waveform distortion, all discrepancies caused by secular changes of an encoder.

In the first example, a provisional adjusting signal is generated by the use of the velocity change amount detection circuit 13, the adjusting signal generation circuit 14, and the storage circuit 15 while a target to be measured is traveling at a constant velocity. Resistance value of each of variable resistors 21a and 21b in the analog signal adjustment circuit 11 is altered based on the provisional adjusting signal for adjusting an analog signal inputted from the sensing unit 40. Then a change amount of velocity is monitored that is calculated via the position detection circuit 12 and the velocity change amount detection circuit 13. The above whole procedure is repeated. The provisional adjusting signal is sequentially updated to reduce the change amount of velocity to be monitored. The change amount of velocity that has converged to a predetermined value is determined as a minimum value and the corresponding provisional adjusting signal is confirmed as a final adjusting signal. The velocity change amount detection circuit 13, the adjusting signal generation circuit 14, and the storage circuit 15 involved in generation of an adjusting signal will be detailed.

Figure 2:
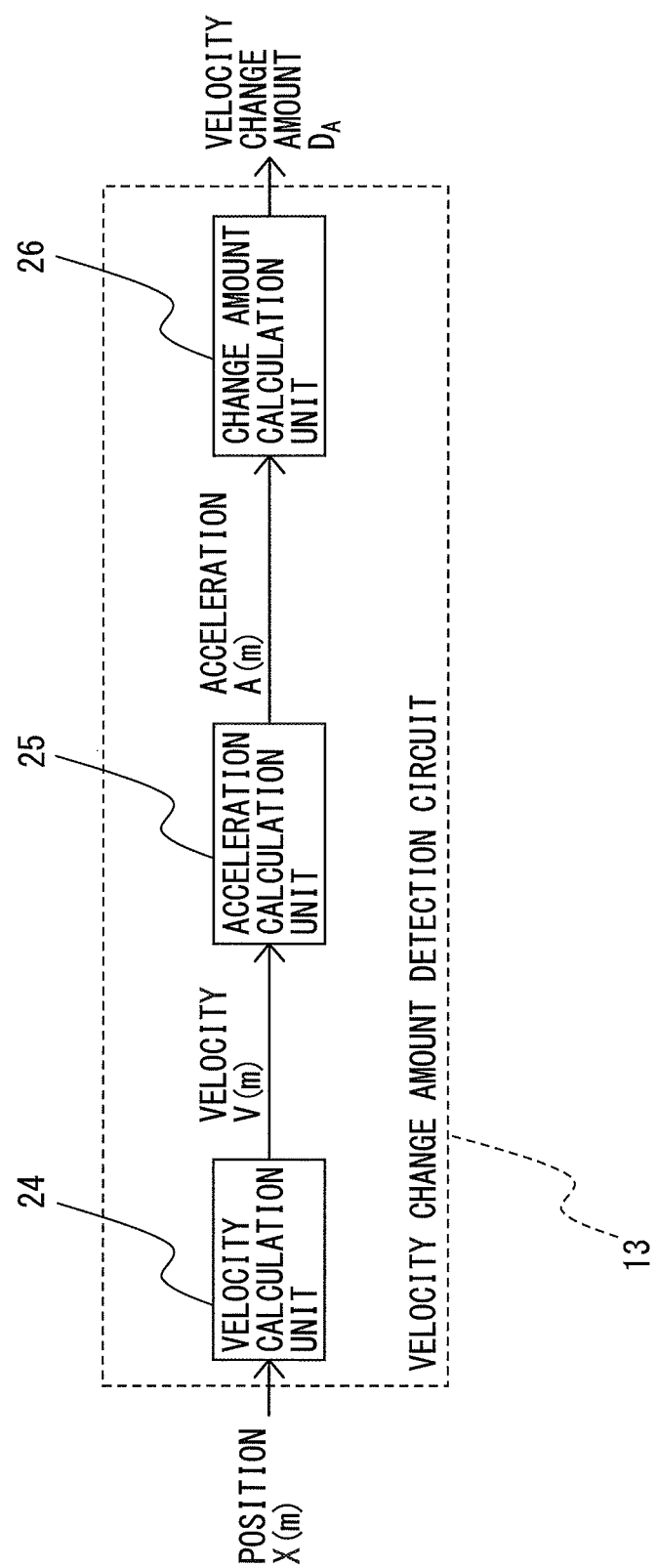
FIG. 2 is a principle block diagram of a velocity change amount detection circuit in the encoder signal processor according to the first example.
Figure 3A:
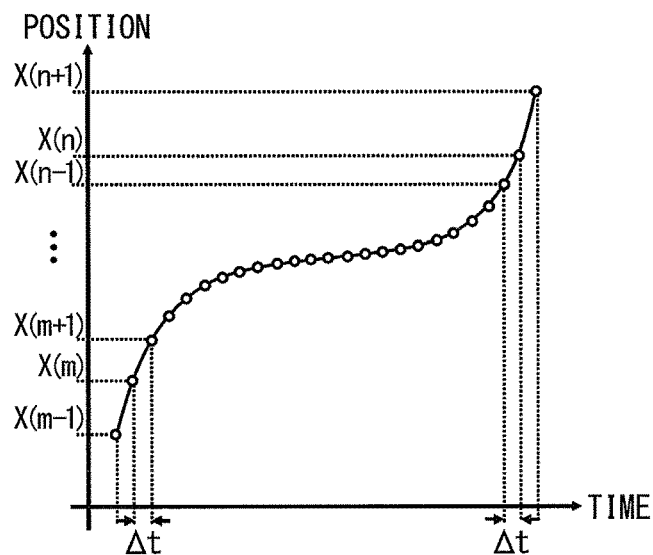
FIG. 3A illustrates the calculation process, related to a position of a target to be measured, of the velocity change amount detection circuit in the encoder signal processor according to the first example.
Figure 3B:
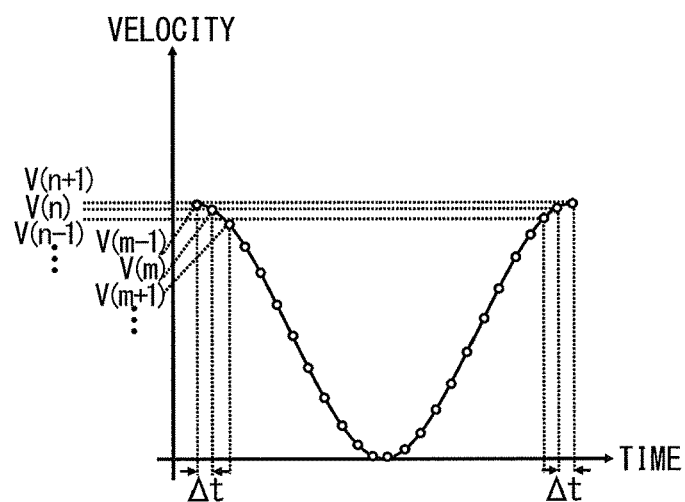
FIG. 3B illustrates the calculation process, related to a velocity of a target to be measured, of the velocity change amount detection circuit in the encoder signal processor according to the first example.
Figure 3C:
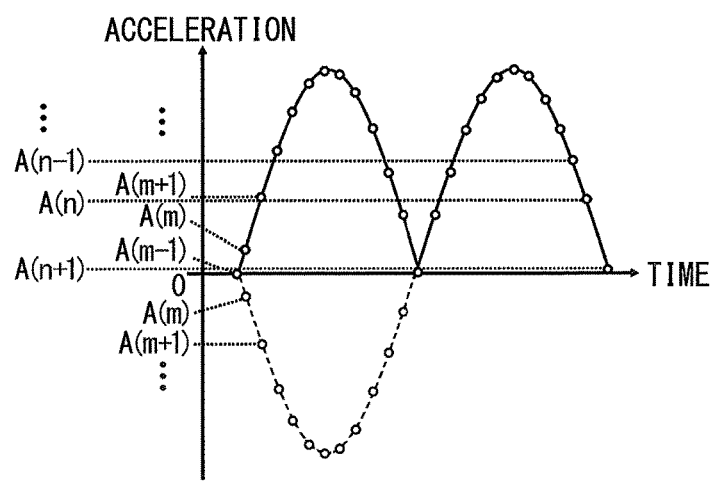
FIG. 3C illustrates the calculation process, related to an acceleration of a target to be measured, of the velocity change amount detection circuit in the encoder signal processor according to the first example.

The velocity change amount detection circuit 13 detects a change amount of velocity per predetermined detection cycle from a velocity calculated based on position data outputted from the position detection circuit 12 while a target to be measured is traveling at a constant velocity. FIG. 2 is a principle block diagram of a velocity change amount detection circuit in the encoder signal processor according to the first example. The velocity change amount detection circuit 13 includes a velocity calculation unit 24, an acceleration calculation unit 25, and a change amount calculation unit 26. FIG. 3A illustrates the calculation process, related to a position of a target to be measured, of the velocity change amount detection circuit in the encoder signal processor according to the first example. FIG. 3B illustrates the calculation process, related to a velocity of a target to be measured, of the velocity change amount detection circuit in the encoder signal processor according to the first example. FIG. 3C illustrates the calculation process, related to an acceleration of a target to be measured, of the velocity change amount detection circuit in the encoder signal processor according to the first example.

Given that, while a target to be measured is traveling at a constant velocity, the position of the target to be measured as detected by a position detection circuit 12 with a certain detection timing m is X(m), the position of the target to be measured as detected with a detection timing m−1 immediately preceding the detection timing is X(m−1), and a position detection cycle is Δt, the velocity calculation unit 24 calculates a velocity V(m) based on Formula 4:

$$V(m) = \frac{X(m) - X(m-1)}{\Delta t} \qquad (4)$$

The acceleration calculation unit 25 calculates an acceleration A(m) based on Formula 5:

$$A(m) = \frac{V(m) - V(m-1)}{\Delta t} \qquad (5)$$

Given that detection timings for defining a predetermined detection cycle larger than the position detection cycle Δt are p and q (where p≤q), the change amount calculation unit 26 calculates a change amount of velocity $D_A$ based on $$D_A = \sum_{k=p}^{q} |A(k)| \qquad (6)$$

where p≤q

As understood from Formula 6, the change amount of velocity $D_A$ can be calculated when at least a single-point acceleration A(k) at an arbitrary detection timing k is obtained. As illustrated in FIGS. 3A to 3C, it is sufficient to perform at least three-point sampling of position data detected by the position detection circuit 12 within a time interval of an arbitrary timings m to n. Provided that a target to be measured is traveling at a constant velocity in the meantime, it is possible to detect the change amount of velocity $D_A$ irrespective of the velocity of the target.

Position detection accuracy can be adjusted as required by setting the cycle of detecting a change amount of velocity defined by the detection timings p and q to an arbitrary multiple of an analog signal cycle T. In other words, the longer the cycle of detecting a change amount of velocity defined by the detection timings p and q, the position detection accuracy becomes lower. When the cycle of detecting a change amount of velocity defined by the detection timings p and q is set to three times the analog signal cycle T, the position detection accuracy drop but random disturbances such as noise are made uniform thus increasing the noise immunity. The detection timings p and q used by the change amount calculation unit 26 may be configured to be arbitrarily specified by the user via a user interface such as a PC. This allows the position detection accuracy to be adjusted.

With reference to FIG. 1, the adjusting signal generation circuit 14 generates an adjusting signal that will minimize the change amount of velocity detected by the velocity change amount detection circuit 13 and transmits the adjusting signal to the analog signal adjustment circuit 11.

The storage circuit 15 stores a set of the change amount of velocity detected by the velocity change amount detection circuit 13 and the provisional adjusting signal transmitted to the analog signal adjustment circuit 11 when the change amount of velocity was detected.

Figure 4:
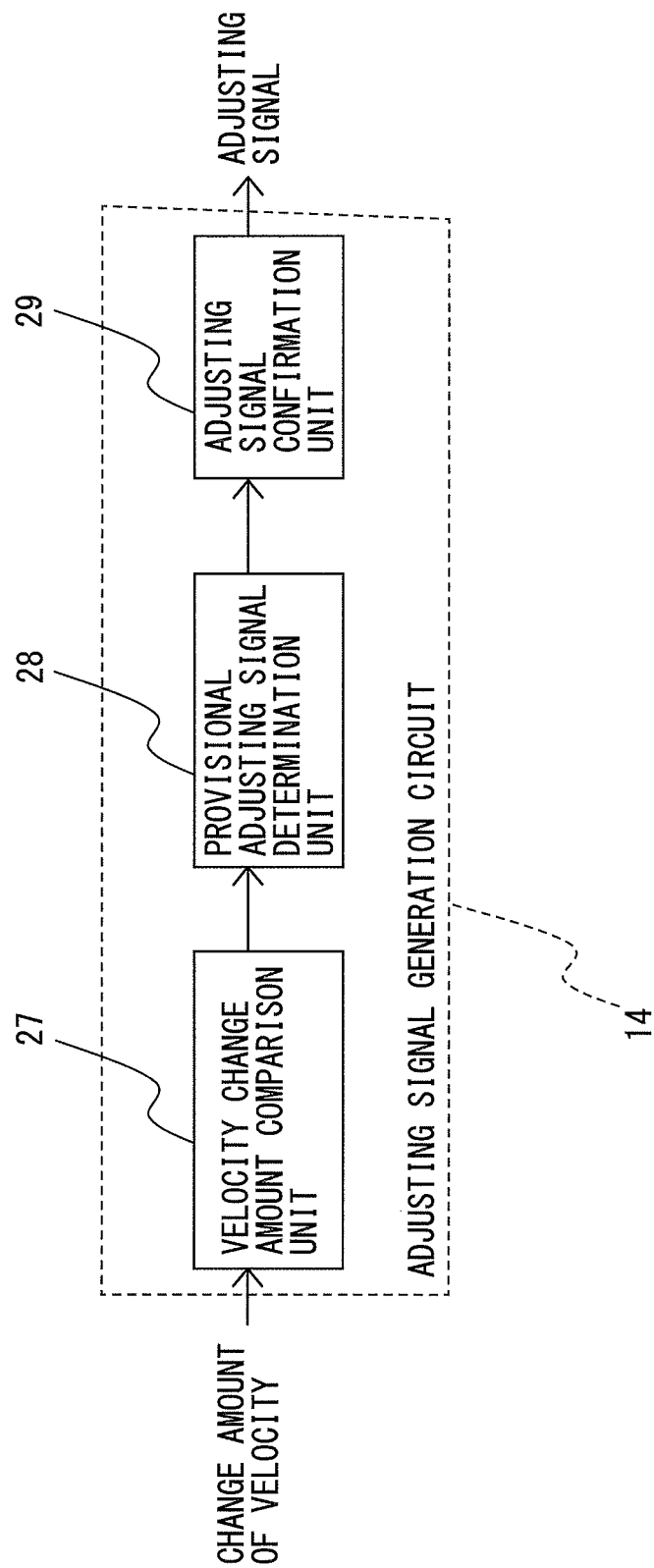
FIG. 4 is a principle block diagram of an adjustment signal generation circuit in the encoder signal processor according to the first example.
Figure 5:
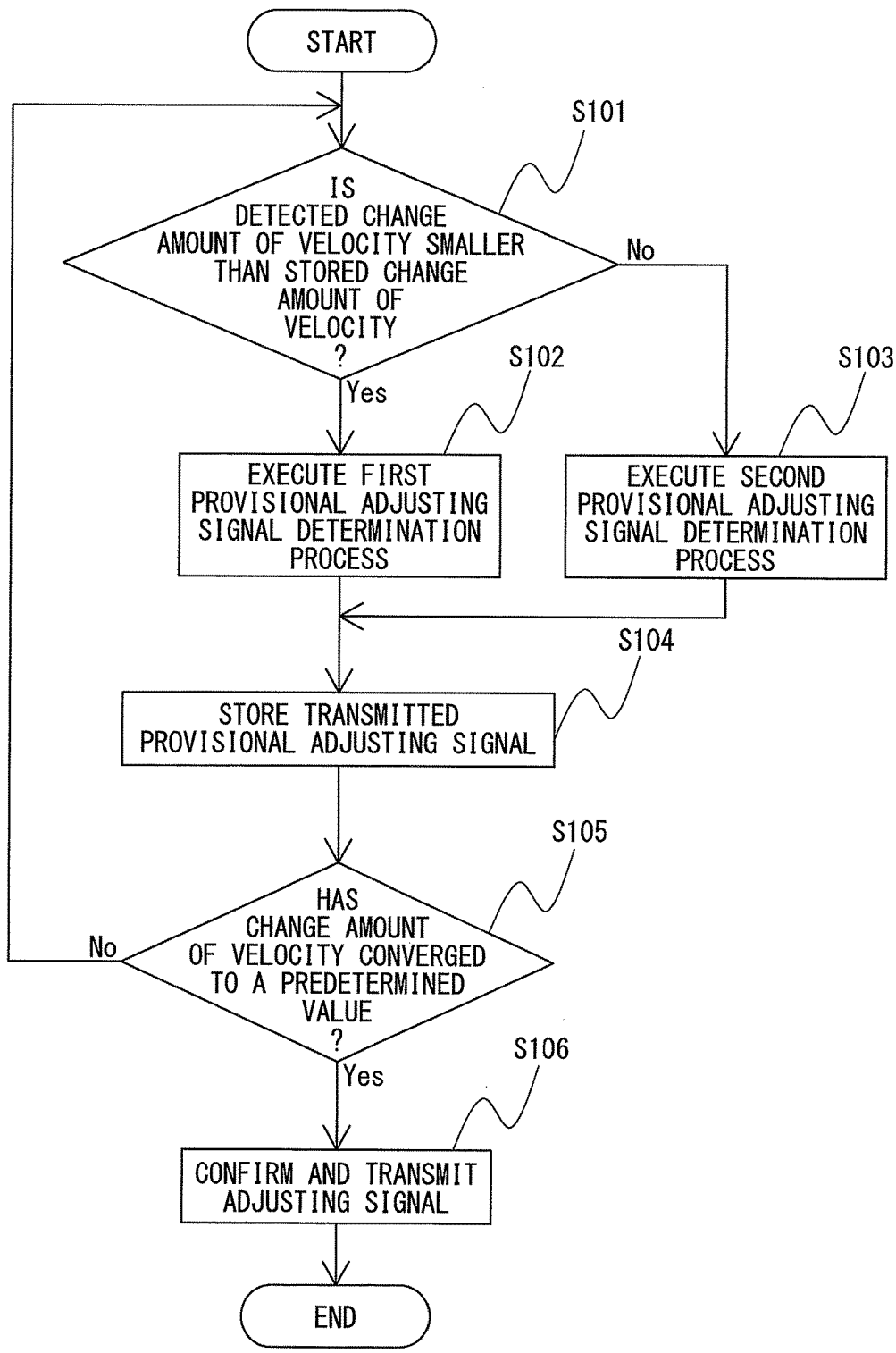
FIG. 5 is a flowchart illustrating generation of an adjustment signal in the encoder signal processor according to the first example.
Figure 6:
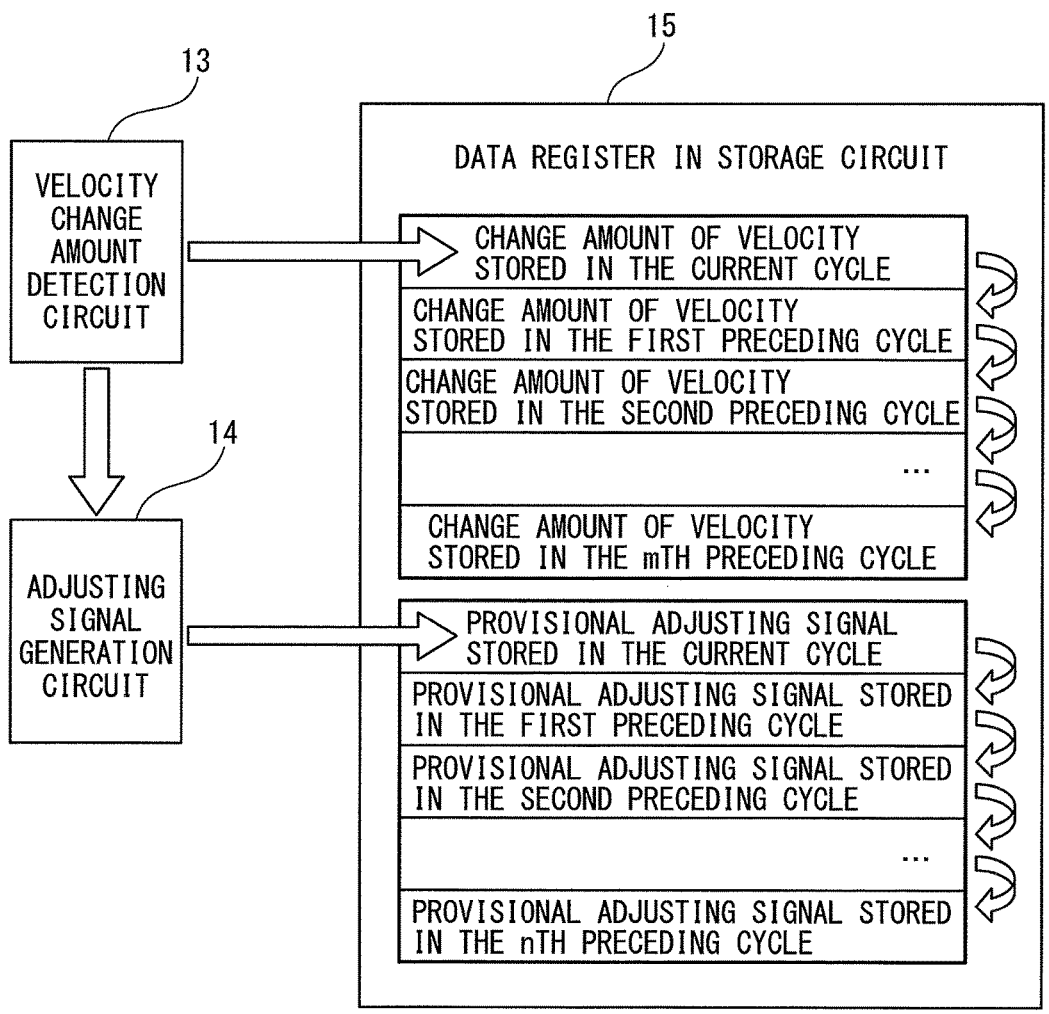
FIG. 6 explains a storage circuit in the encoder signal processor according to the first example.

FIG. 4 is a principle block diagram of an adjustment signal generation circuit in the encoder signal processor according to the first example. FIG. 5 is a flowchart illustrating generation of an adjustment signal in the encoder signal processor according to the first example. FIG. 6 explains a storage circuit in the encoder signal processor according to the first example.

The adjusting signal generation circuit 14 includes a velocity change amount comparison unit 27, a provisional adjusting signal determination unit 28, and an adjusting signal confirmation unit 29.

The velocity change amount comparison unit 27 compares the change amount of velocity detected by the velocity change amount detection circuit 13 with the change amount of velocity detected in a first preceding detection cycle of detection of the change amount of velocity (step S101). The change amount of velocity detected in the first preceding detection cycle of detection of the change amount of velocity by the velocity change amount detection circuit 13 is stored in the storage circuit 15. The velocity change amount comparison unit 27 reads the change amount of velocity in the first preceding cycle from a first storage area 15A of the storage circuit 15 for comparison with the current change amount of velocity detected by the velocity change amount detection circuit 13. When the change amount of velocity detected by the velocity change amount detection circuit 13 is smaller than the change amount of velocity detected in the first preceding detection cycle, the control proceeds to step S102. When the change amount of velocity detected by the velocity change amount detection circuit 13 is larger than the change amount of velocity detected in the first preceding detection cycle, the control proceeds to step S103. The current change amount of velocity detected by the velocity change amount detection circuit 13 compared in size with the change amount of velocity detected in the first preceding detection cycle because it is possible to determine whether the provisional adjusting signal, which was sent to the analog signal adjustment circuit when detecting the change amount of velocity detected in the first preceding cycle, served to reduce the change amount of velocity.

The provisional adjusting signal determination unit 28 determines a provisional adjusting signal based on the change amount of velocity detected by the velocity change amount detection circuit 13 per detection cycle and transmits the provisional adjusting signal to the analog signal adjustment circuit 11. Based on the result of comparison by the velocity change amount comparison unit 27 in step S101, a first provisional adjusting signal determination process (step S102) or a second provisional adjusting signal determination process (step S103) is executed. Steps S102 and S103 are detailed below.

When the velocity change amount comparison unit 27 has determined in step S101 that the change amount of velocity detected by the velocity change amount detection circuit 13 is smaller than the change amount of velocity detected in a first preceding detection cycle, the provisional adjusting signal determination unit 28 determines that operating the analog signal adjustment circuit 11 with the provisional adjusting signal being transmitted can reduce the change amount of velocity, and performs a first provisional signal determination process, i.e., adds the same shift amount as that used for determination of the provisional adjusting signal in the first preceding detection cycle to the resistance value specified by the provisional adjusting signal in the first preceding detection cycle and transmits the resulting signal as a provisional adjusting signal in the current detection cycle to the analog signal adjustment circuit 11 (step S102). The analog signal adjustment circuit 11 adjusts the resistance value of the variable resistors 21a and 21b based on the provisional adjusting signal received.

When the velocity change amount comparison unit 27 has determined in step S101 that the change amount of velocity detected by the velocity change amount detection circuit 13 is larger than the change amount of velocity detected in a first preceding detection cycle, the provisional adjusting signal determination unit 28 determines that operating the analog signal adjustment circuit 11 with the provisional adjusting signal being transmitted cannot reduce the change amount of velocity, and performs a second provisional signal determination process, i.e., subtracts the same shift amount as that used for determination of the provisional adjusting signal in the first preceding detection cycle from the resistance value specified by the provisional adjusting signal in the first preceding detection cycle, and adds a shift amount different from the shift amount and transmits the resulting signal as a provisional adjusting signal in the current detection cycle to the analog signal adjustment circuit 11 (step S103). The analog signal adjustment circuit 11 adjusts the resistance value of the variable resistors 21a and 21b based on the provisional adjusting signal received.

The provisional adjusting signal transmitted to the analog signal adjustment circuit 11 in step S102 or step S103 is stored, together with the change amount of velocity detected by the velocity change amount detection circuit 13, into the storage circuit 15 in step S105. As illustrated in FIG. 6, each time a provisional adjustment signal is transmitted to the analog signal adjustment circuit 11, there is stored, into a data register in the storage circuit 15, a set of the provisional adjusting signal and the change amount of velocity received from the velocity change amount detection circuit 13, the change amount of velocity used for a comparison process by the velocity change amount comparison unit 27 when the provisional adjusting signal was transmitted. While this process will be detailed later, storing multiple sets of a change amount of velocity and a provisional adjusting signal in the past into the data register in the storage circuit 15 provides for more adequate selection of a provisional adjusting signal to be transmitted to the analog signal adjustment circuit 11 based on the details of past adjustments and the result thereof.

In step S105, the adjustment signal confirmation unit 29 determines whether the change amount of velocity detected by the velocity change amount detection circuit 13 has converged to a predetermined value. When the change amount of velocity detected by the velocity change amount detection circuit 13 has converged to a predetermined value, the control proceeds to step S106. When the change amount of velocity detected by the velocity change amount detection circuit 13 has not converged to a predetermined value, the control returns to step S101. Processing of steps S101 to S105 is repeated until the change amount of velocity detected by the velocity change amount detection circuit 13 converges to a predetermined value.

The provisional adjusting signal selected when the change amount of velocity detected by the velocity change amount detection circuit 13 has converged to a predetermined value is considered to minimize the change amount of velocity. The adjustment signal confirmation unit 29 confirms as an adjusting signal the provisional adjusting signal corresponding to the change amount of velocity that has converged to a predetermined value and transmits the resulting signal to the analog signal adjustment circuit 11. The analog signal adjustment circuit 11 adjusts the resistance value of the variable resistors 21a and 21b based on the adjusting signal received.

The first and second provisional adjusting signal determination processes by the provisional adjusting signal determination unit 28 are detailed below.

FIGS. 7A to 7C and FIGS. 8A to 8C explain the provisional adjusting signal determination processes by the provisional adjusting signal determination circuit in the encoder signal processor according to the first example. As mentioned earlier, there are provided one variable resistor for adjusting an amplitude of an analog signal with Phase-A, one variable resistor for adjusting an offset of an analog signal with Phase-A, one variable resistor for adjusting an amplitude of an analog signal with Phase-B, and one variable resistor for adjusting an offset of an analog signal with Phase-B, all analog signals inputted from the sensing unit 40. In the following description, an exemplary variable resistor for adjusting an amplitude of an analog signal with Phase-A, hereinafter referred to as the variable resistor 21a-1, undergoes adjustment.

As mentioned above, when the change amount of velocity detected by the velocity change amount detection circuit 13 is determined larger than the change amount of velocity detected in the first preceding detection cycle, the provisional adjusting signal determination unit 28 reads from the storage unit 15 a provisional adjusting signal different from that being transmitted and transmits the provisional adjusting signal to the analog signal adjustment circuit 11. The provisional adjustment signal selected when the change amount of velocity detected by the velocity change amount detection circuit 13 is determined larger than the change amount of velocity detected in the first preceding detection cycle specifies an adjustment opposite to that specified by the provisional adjusting signal being transmitted or an adjustment to reduce the adjustment amount. As mentioned above, each time a provisional adjustment signal is transmitted to the analog signal adjustment circuit 11, there is stored into the storage circuit 15 a set of the provisional adjusting signal and the change amount of velocity received from the velocity change amount detection circuit 13, the change amount of velocity used for a comparison process by the velocity change amount comparison unit 27. By repeating steps S101 to S105, multiple sets of a change amount of velocity and a provisional adjusting signal are stored into the storage circuit 15. When a set of a change amount of velocity and a provisional adjusting signal is compared with another set of a change amount of velocity and a provisional adjusting signal stored immediately before and another set of a change amount of velocity and a provisional adjusting signal stored immediately after, it is possible to grasp the tendency of degree of the shift amount of the resistance value specified by a provisional adjusting signal in relation to the degree of change amount of velocity. By comparing the change amount of velocity stored currently with the change amount of velocity stored in a first preceding cycle and checking which is larger, it is possible to determine whether the detection accuracy is improved or worsened by the transmission of the provisional adjustment signal stored in the first preceding cycle. Imagine that a difference between the change amount of velocity stored currently and the change amount of velocity stored in the first preceding cycle, hereinafter referred to as a first difference, and the difference between the change amount of velocity stored in the first preceding cycle and the change amount of velocity stored in a second preceding cycle, hereinafter referred to as a second difference, are calculated and then the first difference is compared with the second difference. When the former is substantially equal to the latter, a shift amount of the resistance value by way of the current adjustment is specified to be substantially equal to the shift amount of the resistance value related to the adjustment in the first preceding cycle and a provisional adjusting signal considering the shift amount is created. When the former is smaller than the latter, it is determined that the adjusted change amount of velocity is close to convergence. The shift amount of the resistance value specified by the provisional adjustment signal to be transmitted is set to a smaller value than the shift amount of the resistance value specified by the provisional adjusting signal in the first preceding cycle.

Figure 7A:
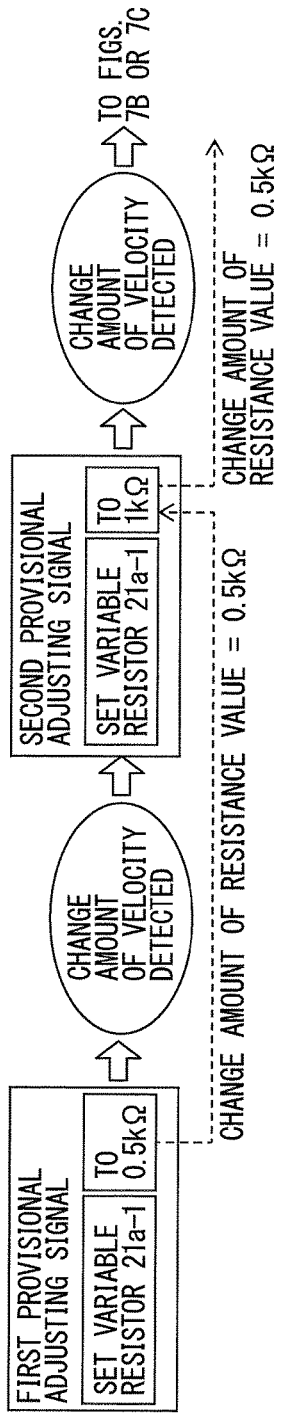
FIGS. 7A to 7C explain the provisional adjusting signal determination processes by a provisional adjusting signal determination circuit in the encoder signal processor according to the first example.

As illustrated in FIG. 7A, imagine a case where a provisional adjusting signal in a certain detection cycle, hereinafter referred to as a first provisional adjusting signal, specifies "setting the resistance value of the variable resistor 21a-1 to 0.5 kΩ" and an initial value of a shift amount of the resistance value by way of adjustments in consecutive detection cycles is set to 0.5 kΩ. In this example, the resistance value of the variable resistor 21a-1 specified by a provisional adjusting signal in the next detection cycle to that of the first provisional adjusting signal, hereinafter referred to as a second provisional adjusting signal, is 1 kΩ, a value obtained by adding a shift amount of 0.5 kΩ to a value of 0.5 kΩ specified by the first provisional adjusting signal. In other words, the second provisional adjusting signal specifies "setting the resistance value of the variable resistor 21a-1 to 1 kΩ". As mentioned above, a change amount of velocity is detected by the velocity change amount detection circuit 13 each time a provisional adjusting signal is transmitted to the analog signal adjustment circuit 11. A set of the provisional adjusting signal transmitted and the change amount of velocity corresponding to the provisional adjusting signal is stored into the storage circuit 15. The value of 0.5 kΩ as a shift amount of the resistance value added to the provisional adjusting signal is illustrative and any other numerical value may be used. This value may be determined by the use of a logic circuit such as an LSI.

Figure 7B:
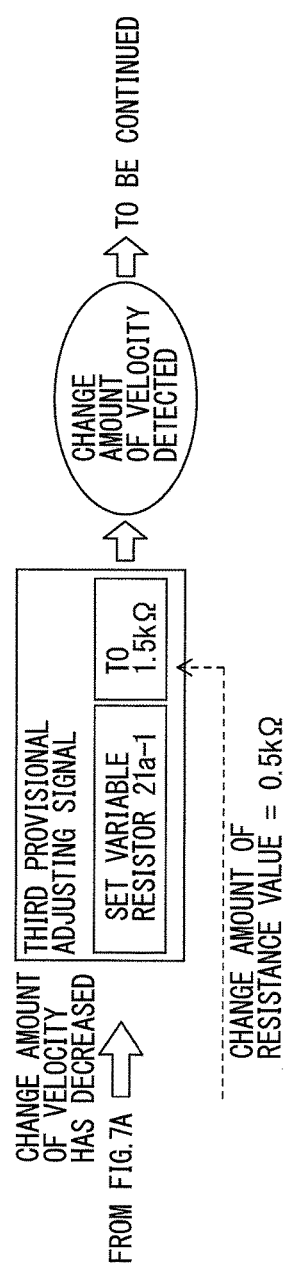

FIG. 7B illustrates a first provisional adjusting signal determination process by the provisional adjusting signal determination unit 28 executed when the velocity change amount comparison unit 27 has compared the change amount of velocity stored currently with the change amount of velocity stored in a first preceding cycle, both read from the storage circuit 15, and has determined that the change amount of velocity decreased, i.e., the change amount of velocity detected by the velocity change amount detection circuit 13 is smaller than the change amount of velocity corresponding to a second provisional adjusting signal detected in the first preceding cycle (step S102). In the first provisional adjusting signal determination process, a shift amount equal to 0.5 kΩ as a shift amount used when the provisional adjusting signal in the first preceding cycle, i.e., a second provisional adjusting signal was determined is added to 1 kΩ as a resistance value specified by the provisional adjusting signal in the first preceding cycle, i.e., the second provisional adjusting signal. The resulting value of 1.5 kΩ is set as a resistance value of the variable resistor 21a-1 in the current detection cycle. In other words, the provisional adjusting signal in the current detection cycle, referred to as a third provisional adjusting signal, specifies "setting the resistance value of the variable resistor 21a-1 to 1.5 kΩ". The third provisional adjusting signal is transmitted to the analog signal adjustment circuit 11, followed by generation of provisional adjusting signals.

Figure 7C:
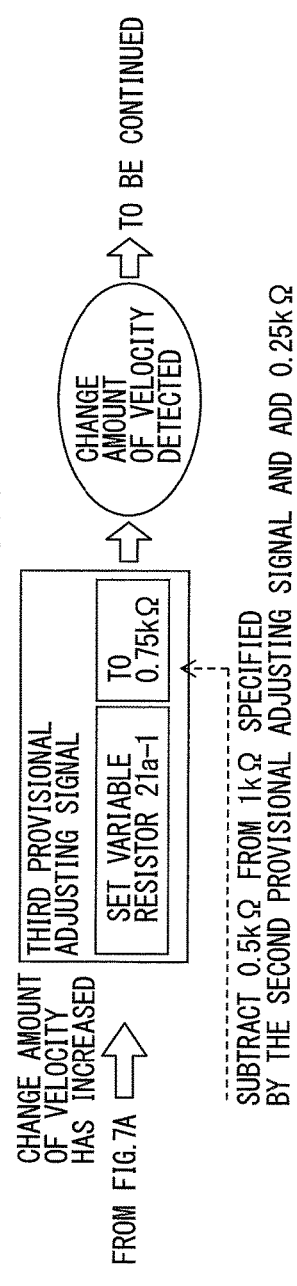

FIG. 7C illustrates a second provisional adjusting signal determination process by the provisional adjusting signal determination unit 28 executed when the velocity change amount comparison unit 27 has compared the change amount of velocity stored currently with the change amount of velocity stored in a first preceding cycle, both read from the storage circuit 15, and has determined that the change amount of velocity increased, i.e., the change amount of velocity detected by the velocity change amount detection circuit 13 is larger than the change amount of velocity corresponding to a second provisional adjusting signal detected in the first preceding cycle (step S103). In the second provisional adjusting signal determination process, a shift amount equal to 0.5 kΩ as a shift amount used when the provisional adjusting signal in the first preceding cycle, i.e., a second provisional adjusting signal was determined is subtracted from a resistance value specified by the provisional adjusting signal in the first preceding cycle, i.e., the second provisional adjusting signal to obtain a resistance value of 0.5 kΩ. Next, a shift amount different from the shift amount of 0.5 kΩ, for example 0.25 kΩ, is added to the resistance value of 0.5 kΩ to obtain a resistance value of 0.75 kΩ, which is set as a resistance value of the variable resistor 21a-1 in the current detection cycle. In other words, the provisional adjusting signal in the current detection cycle, referred to as a third provisional adjusting signal, specifies "setting the resistance value of the variable resistor 21a-1 to 0.75 kΩ". The third provisional adjusting signal is transmitted to the analog signal adjustment circuit 11, followed by generation of provisional adjusting signals. The value of 0.5 kΩ used for the above subtraction process is illustrative and any other numerical value may be used. This value may be determined by the use of a logic circuit such as an LSI.

A provisional adjusting signal obtained when the change amount of velocity obtained when the change amount of velocity detected by the velocity change amount detection circuit 13 has converged to a predetermined value is considered to minimize the change amount of velocity. The adjustment signal confirmation unit 29 confirms as an adjusting signal the provisional adjusting signal corresponding to the change amount of velocity that has converged to the predetermined value and transmits the adjusting signal to the analog signal adjustment circuit 11. The analog signal adjustment circuit 11 adjusts the resistance value of the variable resistors 21a and 21b based on the adjusting signal received.

There may be a case where the change amount of velocity does not converge to a predetermined value despite repeated process of FIG. 7B or FIG. 7C and the resistance value of variable resistors cannot be further altered. This situation is described below. Imagine a case where the process of FIG. 7B or FIG. 7C is repeated and a provisional adjusting signal in a certain detection cycle as illustrated in FIG. 8A, hereinafter referred to as a fifteenth provisional adjusting signal specifies "setting the resistance value of the variable resistor 21a-1 to 0.9 kΩ" and a shift amount of the resistance value by way of adjustments in consecutive detection cycles is 0.01 kΩ. In this example, the resistance value of the variable resistor 21a-1 specified by a provisional adjusting signal in the next detection cycle to that of the fifteenth provisional adjusting signal, hereinafter referred to as a sixteenth provisional adjusting signal, is 0.91 kΩ, a value obtained by adding a shift amount of 0.01 kΩ to a value of 0.9 kΩ specified by the fifteenth provisional adjusting signal. In other words, the sixteenth provisional adjusting signal specifies "setting the resistance value of the variable resistor 21a-1 to 0.91 kΩ". As mentioned above, a change amount of velocity is detected by the velocity change amount detection circuit 13 each time a provisional adjusting signal is transmitted to the analog signal adjustment circuit 11. A set of the provisional adjusting signal transmitted and the change amount of velocity corresponding to the provisional adjusting signal is stored into the storage circuit 15.

FIG. 8B illustrates a first provisional adjusting signal determination process by the provisional adjusting signal determination unit 28 executed when the velocity change amount comparison unit 27 has compared the change amount of velocity stored currently with the change amount of velocity stored in a first preceding cycle, both read from the storage circuit 15, and has determined that the change amount of velocity decreased, i.e., the change amount of velocity detected by the velocity change amount detection circuit 13 is smaller than the change amount of velocity corresponding to a sixteenth provisional adjusting signal detected in the first preceding cycle (step S102). In the first provisional adjusting signal determination process, a shift amount equal to 0.01 kΩ as a shift amount used when the provisional adjusting signal in the first preceding cycle, i.e., a sixteenth provisional adjusting signal was determined is added to 0.91 kΩ as a resistance value specified by the provisional adjusting signal in the first preceding cycle, i.e., the sixteenth provisional adjusting signal. The resulting value of 0.92 kΩ is set as a resistance value of the variable resistor 21a-1 in the current detection cycle. In other words, the provisional adjusting signal in the current detection cycle, referred to as a seventeenth provisional adjusting signal, specifies "setting the resistance value of the variable resistor 21a-1 to 0.92 kΩ". The seventeenth provisional adjusting signal is transmitted to the analog signal adjustment circuit 11, followed by generation of provisional adjusting signals.

FIG. 8C illustrates a second provisional adjusting signal determination process by the provisional adjusting signal determination unit 28 executed when the velocity change amount comparison unit 27 has compared the change amount of velocity stored currently with the change amount of velocity stored in a first preceding cycle, both read from the storage circuit 15, and has determined that the change amount of velocity increased, i.e., the change amount of velocity detected by the velocity change amount detection circuit 13 is larger than the change amount of velocity corresponding to a sixteenth provisional adjusting signal detected in the first preceding cycle (step S103). In the second provisional adjusting signal determination process, as illustrated in FIG. 7C, a shift amount equal to a shift amount used when the provisional adjusting signal in the first preceding cycle was determined is subtracted from a resistance value specified by the provisional adjusting signal in the first preceding cycle, and a shift amount different from the shift amount is added, and then the resulting signal is transmitted as a provisional adjusting signal in the current detection cycle to the analog signal adjustment circuit 11. When the shift amount of the variable resistor 21a-1 cannot be set to a value accurate to a further decimal place than the original value, i.e., a third decimal place, 0.01 kΩ in this example. In this case, concerning the variable resistor 21a-1, a shift amount equal to a shift amount of 0.01 kΩ used when the provisional adjusting signal in the first preceding cycle, i.e., a sixteenth provisional adjusting signal was determined is subtracted from a resistance value of 0.91 kΩ specified by the provisional adjusting signal in the first preceding cycle, i.e., the sixteenth provisional adjusting signal. A value of 0.9 kΩ obtained is set as a resistance value of the variable resistor 21a-1 in the current detection cycle. In other words, the provisional adjusting signal in the current detection cycle, referred to as a seventeenth provisional adjusting signal, specifies "setting the resistance value of the variable resistor 21a-1 to 0.9 kΩ". This completes the provisional adjusting signal determination process for the variable resistor 21a-1. The adjustment signal confirmation unit 29 which is at the next step of the provisional adjusting signal determination unit confirms as an adjusting signal the seventeenth provisional adjusting signal. The provisional adjusting signal determination unit 28 switches the variable resistor to be adjusted from the variable resistor 21a-1 for adjusting an amplitude of an analog signal with Phase-A to a variable resistor for adjusting an offset of an analog signal with Phase-A, hereinafter referred to as a variable resistor 21a-2, and executes the processes described with reference to FIGS. 7A to 7C. In other words, a first provisional adjusting signal for a further variable resistor 21a-2 to be adjusted specifies "setting the resistance value of the variable resistor 21a-2 to 0.5 kΩ". FIGS. 8A to 8C illustrate an example where an adjustment target is switched to a variable resistor for adjusting an offset of an analog signal with Phase-A after the variable resistor for adjusting an amplitude of an analog signal with Phase-A has been adjusted. The figures are illustrative and an order of adjustment may be specified as appropriate among a variable resistor for adjusting an amplitude of an analog signal with Phase-A, a variable resistor for adjusting an offset of an analog signal with Phase-A, a variable resistor for adjusting an amplitude of an analog signal with Phase-B, and a variable resistor for adjusting an offset of an analog signal with Phase-B. A variable resistor for which an adjusting signal is confirmed may be readjusted after multiple variable resistors have been adjusted; its order of adjustment may be determined by the use of a logic circuit such as an LSI.

For example, it is possible to discriminate adjusted variable resistors from non-adjusted ones by operating multiple adjusting signals stored in the storage circuit 15. It is possible to determine generation of an adjusting signal for a non-adjusted variable resistor, if any. It is also possible to determine adjusted variable resistors that need further adjustment by checking the times of adjustments thereon.

Figure 9A:
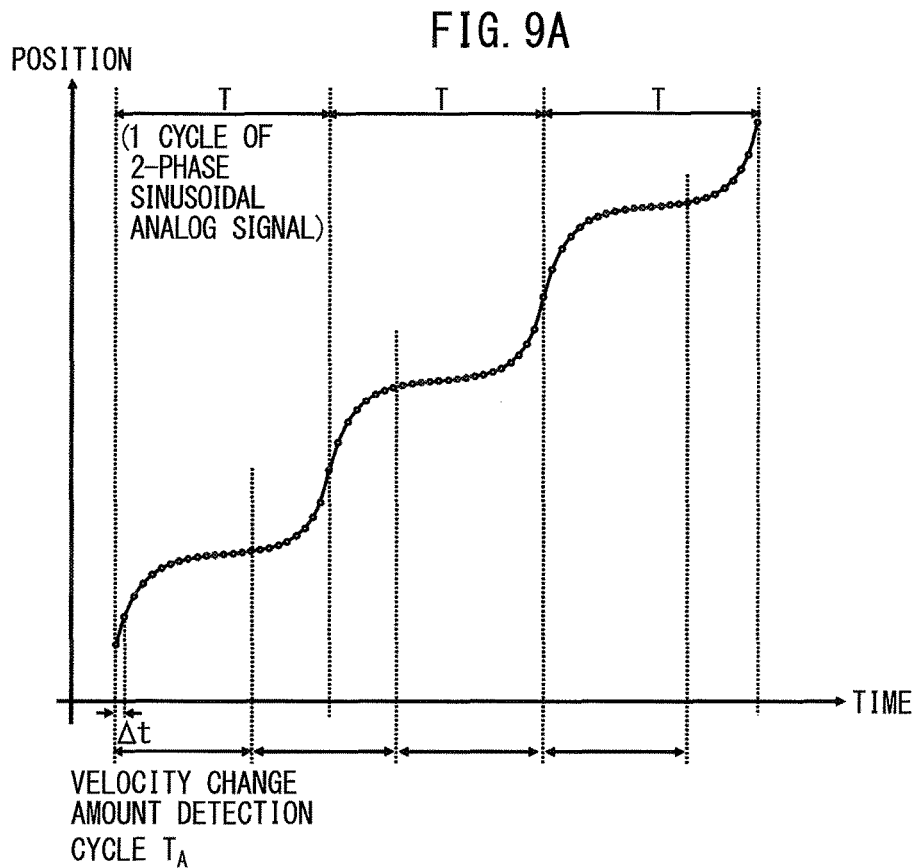
FIG. 9A explains a detection cycle of a change amount of velocity while illustrating position data outputted from a position detection circuit mounted on a target traveling at a constant velocity.
Figure 9B:
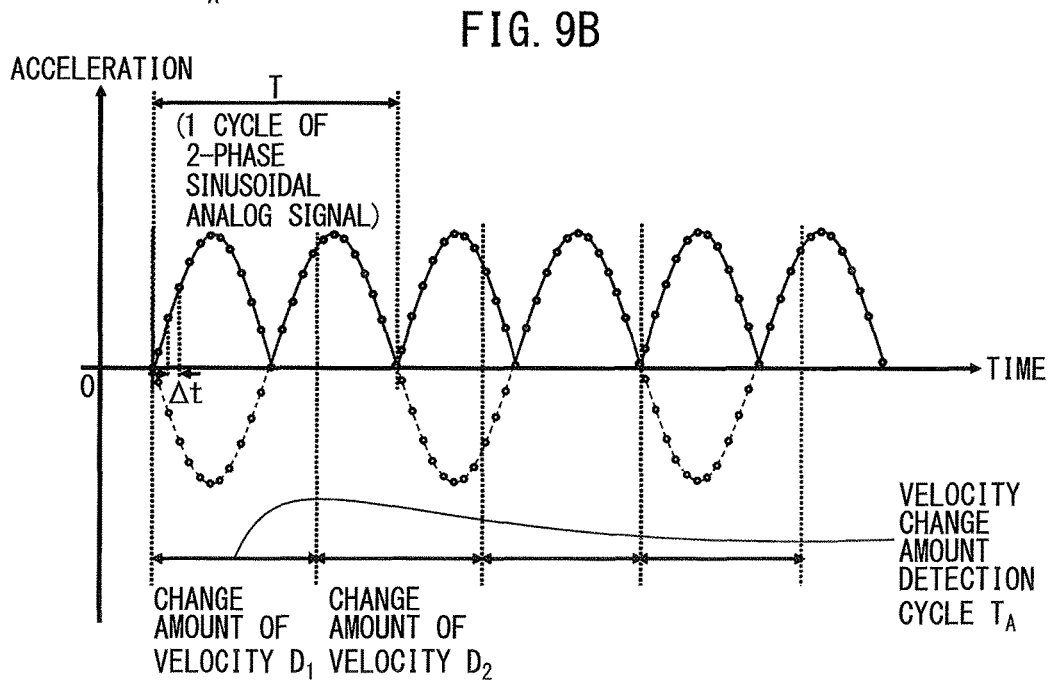
FIG. 9B explains a detection cycle of a change amount of velocity while illustrating a change amount of velocity calculated from the position data illustrated in FIG. 9A.
Figure 10A:
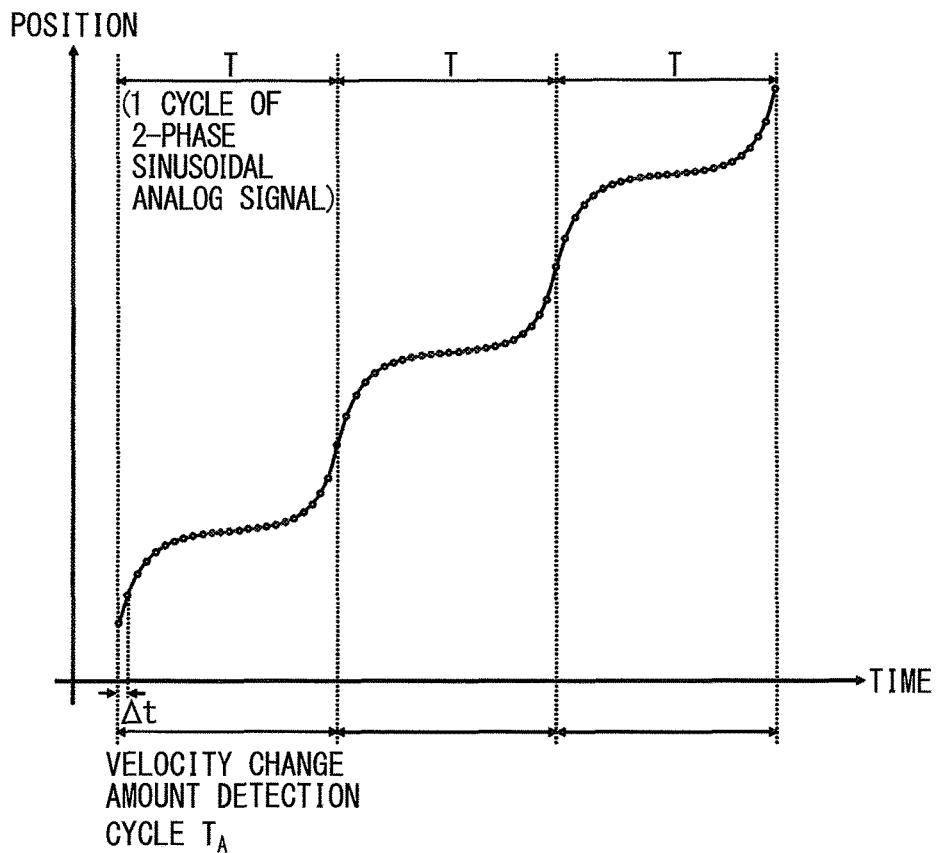
FIG. 10A explains a detection cycle of a change amount of velocity applied to the first example while illustrating position data outputted from a position detection circuit mounted on a target traveling at a constant velocity.
Figure 10B:
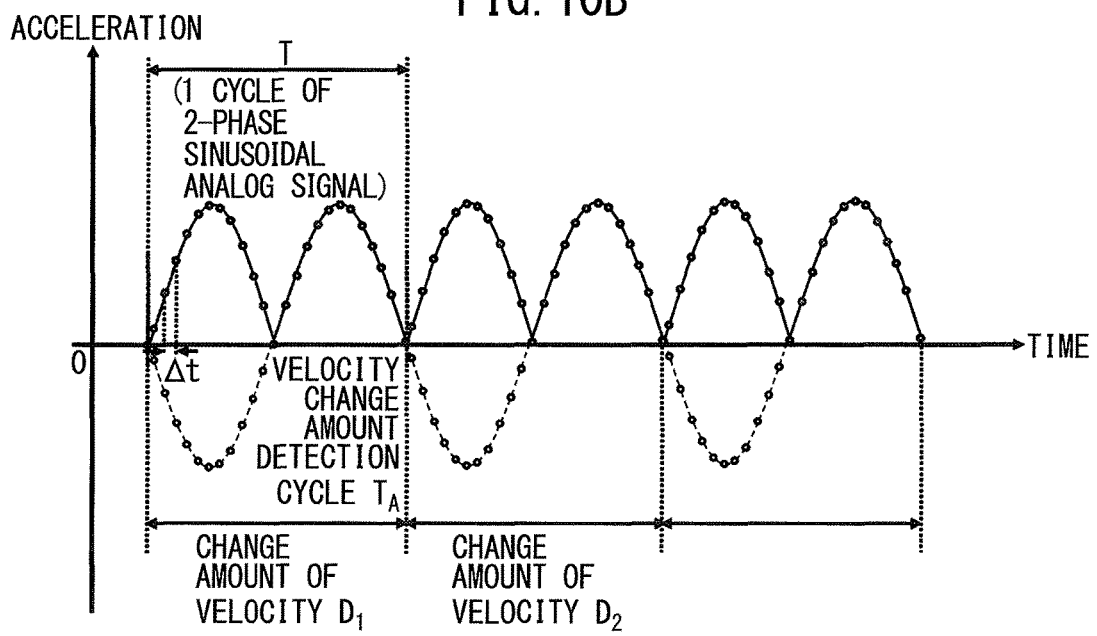
FIG. 10B explains a detection cycle of a change amount of velocity applied to the first example while illustrating a change amount of velocity calculated from the position data illustrated in FIG. 10A.

Next, the detection cycle of a change amount of velocity by the velocity change amount detection circuit 13 is described below. In the first example, the detection cycle of a change amount of velocity by the velocity change amount detection circuit 13 is preferably an integral multiple of a cycle of a sinusoidal analog signal with two phases having a 90-degree difference, outputted in accordance with a travel of a target to be measured, i.e., outputted from the sensing unit 40. Reasons for this are described below with reference to FIGS. 9A, 9B, 10A and 10B. FIG. 9A explains a detection cycle of a change amount of velocity while illustrating position data outputted from a position detection circuit mounted on a target traveling at a constant velocity. FIG. 9B explains a detection cycle of a change amount of velocity while illustrating a change amount of velocity calculated from the position data illustrated in FIG. 9A. FIG. 10A explains a detection cycle of a change amount of velocity applied to the first example while illustrating position data outputted from a position detection circuit mounted on a target traveling at a constant velocity. FIG. 10B explains a detection cycle of a change amount of velocity applied to the first example while illustrating a change amount of velocity calculated from the position data illustrated in FIG. 10A.

As illustrated in FIG. 9A, it is widely known that a shift of an amplitude, a phase or an offset of a sinusoidal analog signal with two phases having a 90-degree difference outputted from the sensing unit 40 in accordance with a travel of a target to be measured may typically generate cyclic error components in the sinusoidal analog signal with respect to the cycle T thereof. Given a detection cycle $T_A$ of a change amount of velocity is an non-integral multiple of T (for example, $T_A$=T/3), change amounts of velocity $D_1$, $D_2$, ..., detected per detection cycle will differ from each other as illustrated in FIG. 9B. An attempt to generate an adjusting signal while using a detection cycle $T_A$ of a change amount of velocity as an non-integral multiple of T results in a need for discriminate an increase or a decrease in a change amount of velocity by an adjusting signal from an increase or a decrease in a change amount of velocity by a detection cycle in the implementation of a control system. This will complicate a signal determination logic in the adjusting signal generation circuit 14.

In the first example, a detection cycle $T_A$ of a change amount of velocity by the velocity change amount detection circuit 13 is set to an integral multiple of the cycle T of a sinusoidal analog signal with two phases having a 90-degree difference. As illustrated in FIG. 10A, the detection cycle $T_A$ of a change amount of velocity may be equal to the detection cycle T of an analog signal. Change amounts of velocity $D_1$, $D_2$, ..., detected per detection cycle $T_A$ will take almost the same values unless adjusted by the analog signal adjustment circuit. This will simplify a signal determination logic in the adjusting signal generation circuit 14.

A variant of the first example is described below.

When the amplitude of an analog signal with one of the two phases having a 90-degree difference of a two-phase sinusoidal analog signal outputted in accordance with a travel of a target to be measured is in the vicinity of zero, the adjusting signal generation circuit 14 preferably generates a provisional adjusting signal for adjusting at least one of an offset and an amplitude of an analog signal with the other phase and transmits the provisional adjusting signal to the analog signal adjustment circuit. The reason is described below with reference to FIGS. 11A and 11B. FIGS. 11A and 11B are Lissajous diagrams each explaining a variant of generation of the provisional adjusting signal by the adjusting signal generation circuit in the encoder signal processor according to the first example. With reference to FIGS. 11A and 11B, Phase-A and Phase-B of a sinusoidal analog signal with two phases having a 90-degree difference outputted in accordance with a travel of the target to be measured are assigned to horizontal axis and vertical axis, respectively. For example, as illustrated in FIG. 11A, when at least one of an offset and an amplitude of a signal with Phase-A is adjusted, an interpolation angle after adjustment θ' takes a value different from that of an interpolation angle before adjustment θ. When signal adjustment is made by the analog signal adjustment circuit 11 based on an adjusting signal while an encoder is rotating, an interpolation angle θ will abruptly change to an interpolation angle after adjustment θ', which may disrupt processing in an encoder signal processor 1.

On the other hand, while the amplitude of an analog signal with Phase-B, one of the two phases having a 90-degree difference of a two-phase sinusoidal analog signal is in the vicinity of zero, at least one of an offset and an amplitude of the other phase, Phase A, may be adjusted as illustrated in FIG. 11B. In this case, an interpolation angle after adjustment θ' takes a value nearly equal to that of an interpolation angle before adjustment θ, meaning a small change in an interpolation angle before and after an adjustment. In this variant, an adjusting signal for one of the phases is transmitted while an amplitude of the other phase is in the vicinity of zero. This prevents disturbances in the processing in the encoder signal processor 1 even while the encoder is rotating.

Figure 12:
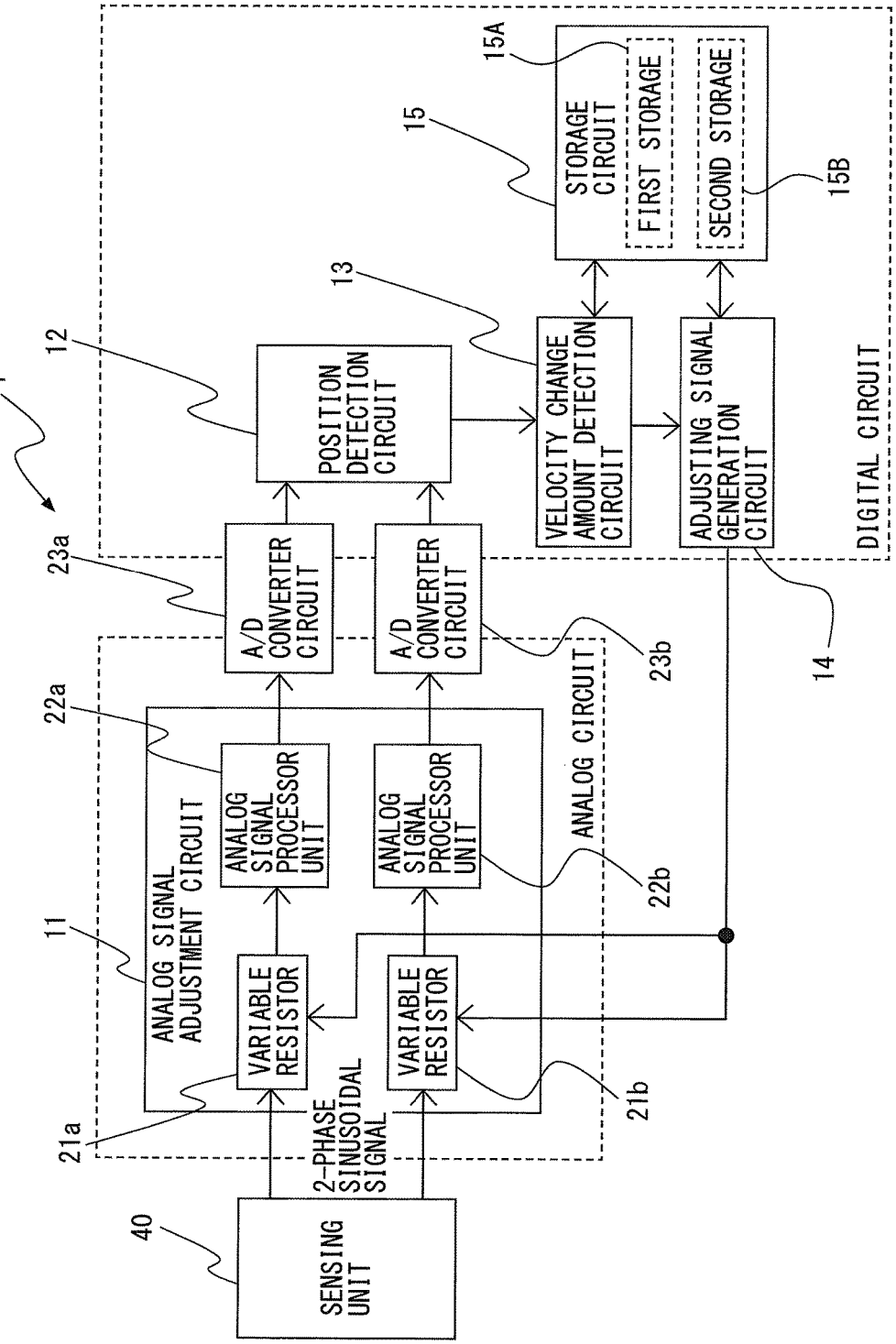
FIG. 12 is a principle block diagram of an encoder signal processor according to a second example.

Next, an encoder signal processor according to a second example is described below. FIG. 12 is a principle block diagram of an encoder signal processor according to the second example. A storage circuit 15 in the encoder signal processor 1 further includes a first storage area 15A for storing a set of a change amount of velocity detected by the change amount detection circuit 13 and a provisional adjusting signal transmitted to the analog signal adjustment circuit 11 when the change amount of velocity was detected, and a second storage area 15B for storing a predefined provisional adjusting signal as a candidate to be transmitted to the analog signal adjustment circuit. While a shift amount of a resistance value used for determine a provisional adjusting signal is determined by a logic circuit such as an LSI in the first example, a provisional adjusting signal as a candidate to be transmitted to the analog signal adjustment circuit 11 is predefined and stored in the second storage area 15B in the storage circuit 15. A provisional adjusting signal to be transmitted is read from the second storage area 15B in the first or second provisional adjusting signal determination process by the provisional adjusting signal determination unit 28. In the second example, a set of a change amount of velocity detected by the velocity change amount detection circuit 13 and a provisional adjusting signal transmitted to the analog signal adjustment circuit 11 when the change amount of velocity was detected is stored into the first storage area 15A in the storage circuit 15.

Figure 13:
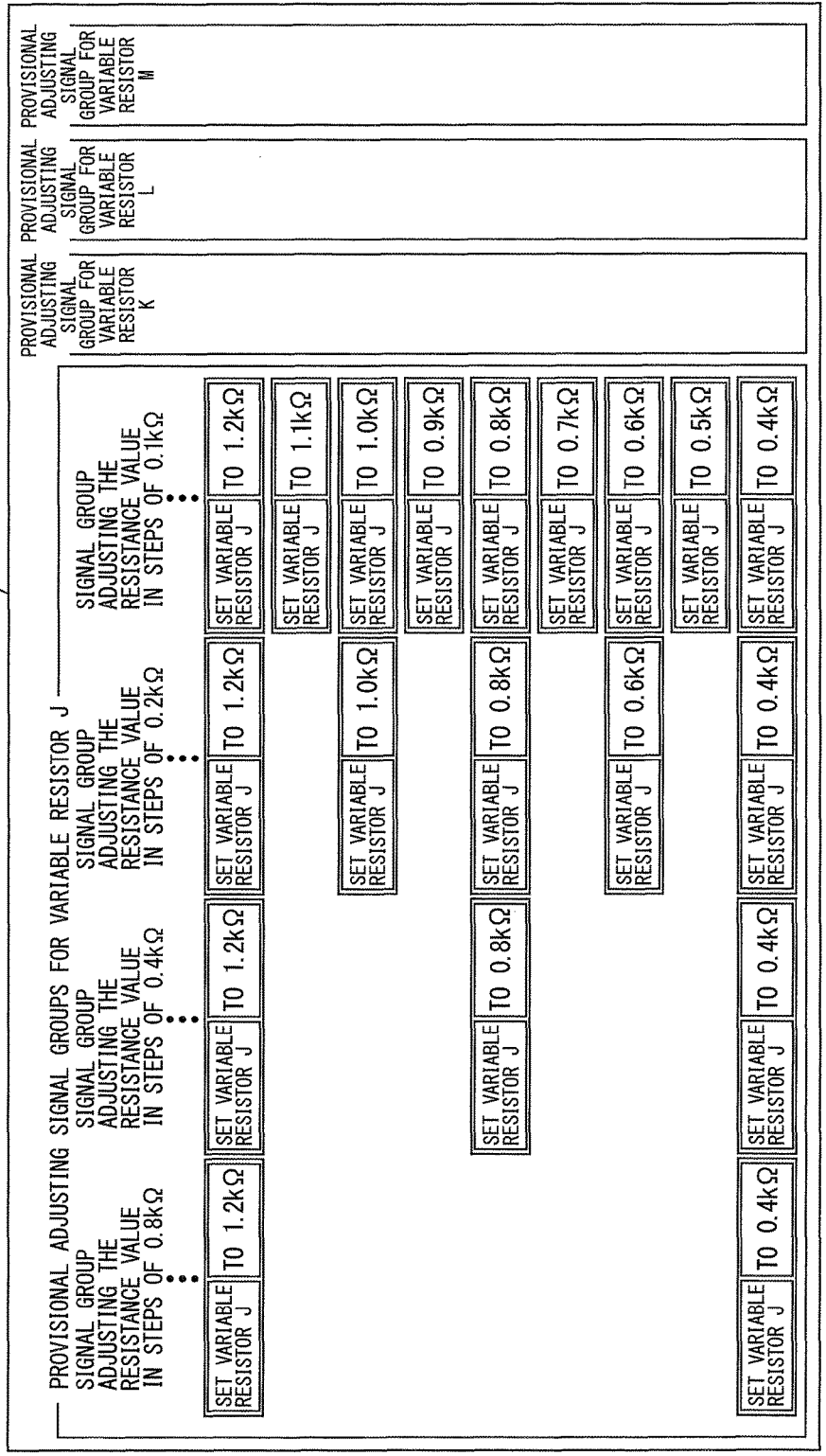
FIG. 13 explains a group of provisional adjusting signals stored in a second storage area in a storage circuit in the encoder signal processor according to the second example.

FIG. 13 explains a group of provisional adjusting signals stored in a second storage area in a storage circuit in the encoder signal processor according to the second example.

As mentioned above, the variable resistors are individually provided to adjust each of an offset and an amplitude of an analog signal with one of the two phases. In FIG. 13, for clarity, a variable resistor for adjusting an amplitude of an analog signal with Phase-A is assigned a reference character J, a variable resistor for adjusting an offset of an analog signal with Phase-A is assigned a reference character K, a variable resistor for adjusting an amplitude of an analog signal with Phase-B is assigned a reference character L, and a variable resistor for adjusting an offset of an analog signal with Phase-A is assigned a reference character M.

A provisional adjusting signal specifies the identification information of a variable resistor to be adjusted and the information on the target resistance value thereof. As groups of provisional adjusting signals used for the variable resistor J, a signal group adjusting the resistance value in steps of 0.8 kΩ, a signal group adjusting the resistance value in steps of 0.4 kΩ, a signal group adjusting the resistance value in steps of 0.2 kΩ, and a signal group adjusting the resistance value in steps of 0.1 kΩ are stored in the second storage area 15B in the storage circuit 15. Groups of provisional adjusting signals used for the variable resistor K, L or M have the same configuration and are stored in the same way although they are not illustrated in FIG. 13. Resistance values in FIG. 13 are illustrative and any other values may be used.

The flowchart illustrated in FIG. 5 is also applicable to the second example.

First, a velocity change amount comparison unit 27 compares a change amount of velocity detected by the velocity change amount detection circuit 13 with a change amount of velocity detected in a first preceding detection cycle of detection of the change amount of velocity (step S101). The change amount of velocity detected in the first preceding detection cycle of detection of the change amount of velocity detected by the velocity change amount detection circuit 13 is already stored in the first storage area 15A in the storage circuit 15. The velocity change amount comparison unit 27 reads the stored change amount of velocity from the first storage area in the storage circuit 15 for comparison with the current change amount of velocity detected by the velocity change amount detection circuit 13. When the change amount of velocity detected by the velocity change amount detection circuit 13 is smaller than the change amount of velocity detected in the first preceding detection cycle, the control proceeds to step S102. When the change amount of velocity detected by the velocity change amount detection circuit 13 is larger than the change amount of velocity detected in the first preceding detection cycle, the control proceeds to step S103.

When the velocity change amount comparison unit 27 has determined in step S101 that the change amount of velocity detected by the velocity change amount detection circuit 13 is smaller than the change amount of velocity detected in the first preceding detection cycle, the provisional adjusting signal determination unit 28 reads from the second storage area 15B a provisional adjusting signal that specifies a resistance value obtained by adding the same shift amount as that used when the provisional adjusting signal in the first preceding cycle was determined in the first provisional signal determination process to the resistance value specified by the provisional adjusting signal in the first preceding detection cycle, and transmits the signal as a provisional adjusting signal in the current detection cycle to the analog signal adjustment circuit 11 (step S102). The analog signal adjustment circuit 11 adjusts the resistance value of the variable resistors 21a and 21b based on the provisional adjusting signal received.

When the velocity change amount comparison unit 27 has determined in step S101 that the change amount of velocity detected by the velocity change amount detection circuit 13 is larger than the change amount of velocity detected in the first preceding detection cycle, the provisional adjusting signal determination unit 28 reads from the second storage area 15B a provisional adjusting signal that specifies a resistance value obtained by subtracting the same shift amount as that used when the provisional adjusting signal in the first preceding cycle was determined in the second provisional signal determination process from the resistance value specified by the provisional adjusting signal in the first preceding detection cycle and adding a shift amount different from the shift amount, and transmits the signal as a provisional adjusting signal in the current detection cycle to the analog signal adjustment circuit 11 (step S103). The analog signal adjustment circuit 11 adjusts the resistance value of the variable resistors 21a and 21b based on the provisional adjusting signal received.

The provisional adjusting signal transmitted to the analog signal adjustment circuit 11 in step S102 or S103 is stored into the first storage area 15A in the storage circuit 15 in step S105, together with the change amount of velocity detected by the velocity change amount detection circuit 13. In other words, each time a provisional adjustment signal is transmitted to the analog signal adjustment circuit 11, there is stored into the first storage area 15A in the storage circuit 15 a set of the provisional adjusting signal and the change amount of velocity received from the velocity change amount detection circuit 13, the change amount of velocity used for a comparison process by the velocity change amount comparison unit 27. In this way, according to the second example, storing multiple sets of a change amount of velocity and a provisional adjusting signal in the past into the first storage area 15A in the storage circuit 15 provides for more adequate selection of a provisional adjusting signal to be transmitted to the analog signal adjustment circuit from the second storage area 15B based on the details of past adjustments and the result thereof stored in the first storage area 15A.

The storage circuit 15, the velocity change amount comparison unit 17, and the provisional adjusting signal determination unit 28 are the same as those used in the first example. The same signs are assigned to the same circuit components and detailed description is omitted. The variant of the first example described above is also applicable to the second example.

Figure 14:
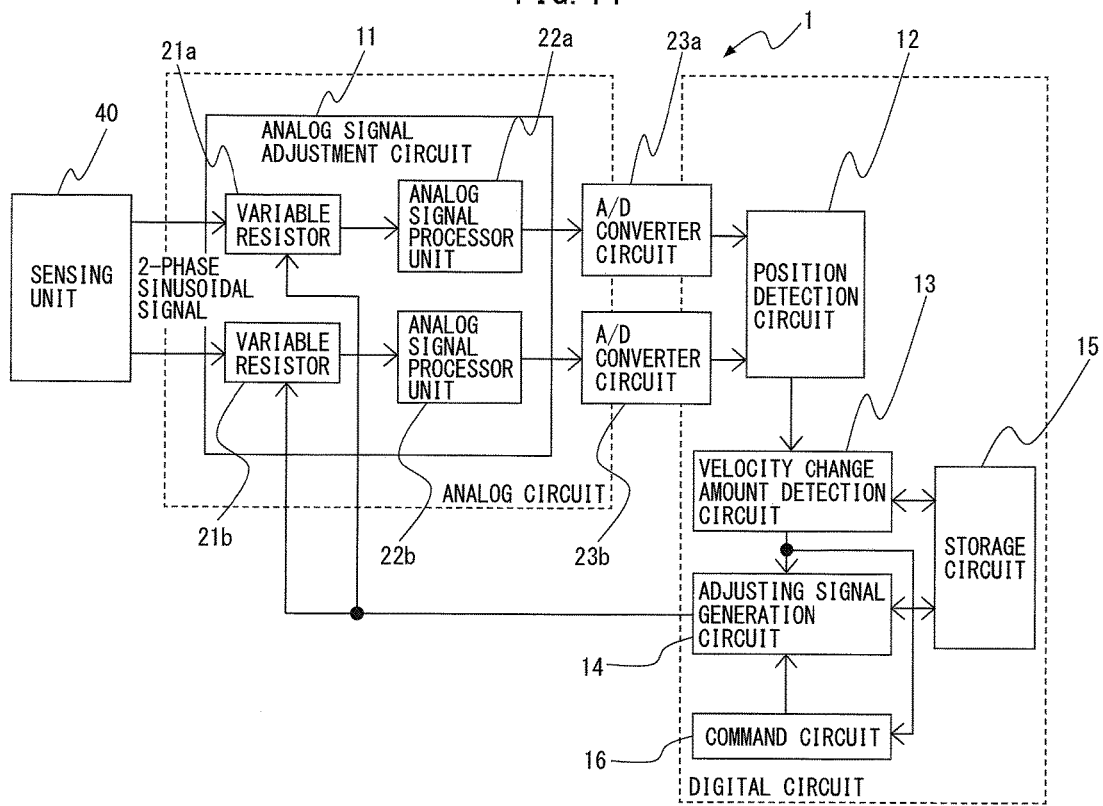
FIG. 14 is a principle block diagram of an encoder signal processor according to a third example.

Next, an encoder signal processor according to a third example is described below. FIG. 14 is a principle block diagram of an encoder signal processor according to the third example. The third example includes a command circuit 16 besides the encoder signal processor 1 according to the first example. Components except the command circuit 16 are the same as those used in the first example. The same signs are assigned to the same circuit components and detailed description is omitted. The variant of the first example described above is also applicable to the third example.

Figure 15A:
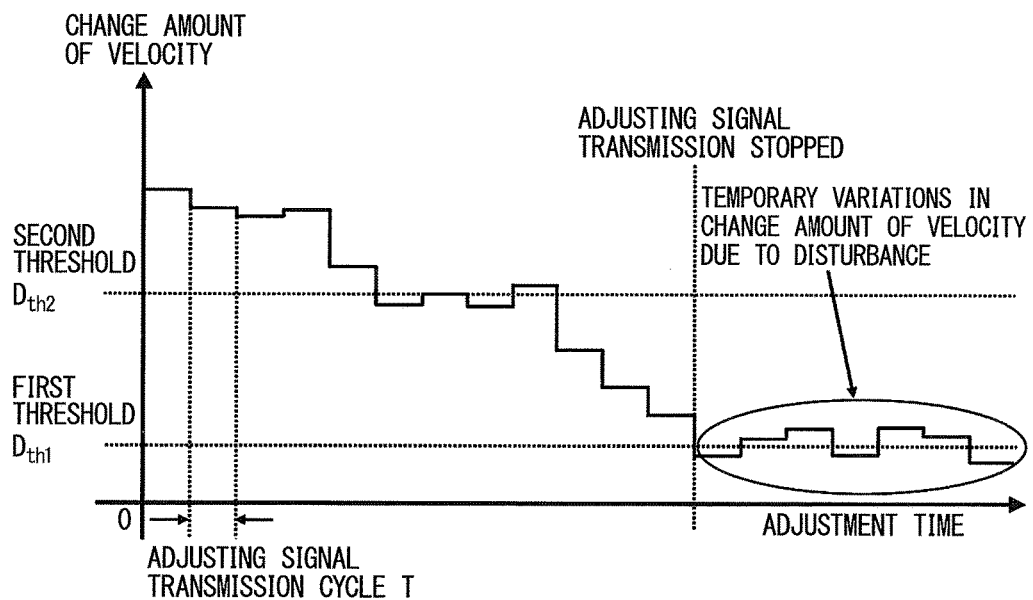
FIG. 15A illustrates the operation and effects of the encoder signal processor according to the third example assumed when a change amount of velocity is disrupted by noise or other disturbances.
Figure 15B:
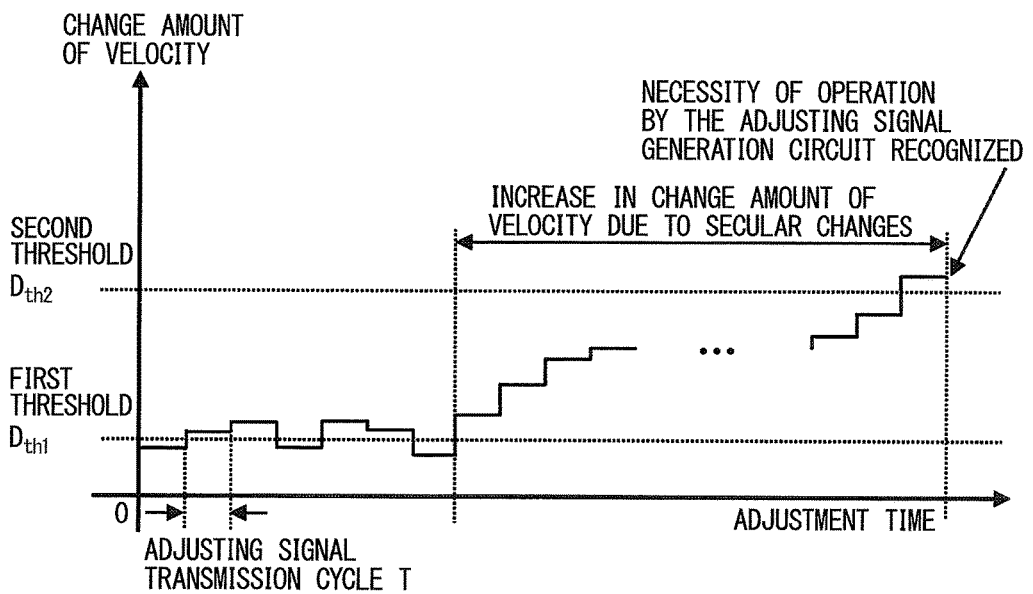
FIG. 15B illustrates the operation and effects of the encoder signal processor according to the third example assumed when a change amount of velocity has increased due to secular changes of the encoder.

The command circuit 16 is configured as a digital circuit for performing arithmetic processing of digital signals, as with the position detection circuit 12, the velocity change amount detection circuit 13, the adjusting signal generation circuit 14, and the storage circuit 15. The command circuit 16 commands the adjusting signal generation circuit 14 to stop generation of an adjusting signal when the change amount of velocity detected by the velocity change amount detection circuit is smaller than a first predefined threshold $D_{th1}$ and commands the adjusting signal generation circuit 14 to start generation of an adjusting signal when the change amount of velocity detected by the velocity change amount detection circuit 13 is larger than a second threshold $D_{th2}$. It is assumed that the second predefined threshold $D_{th2}$ is larger than the first predefined threshold $D_{th1}$. In this way, in the third example, the command circuit 16 is constantly monitoring a change amount of velocity detected by the velocity change amount detection circuit 13. When the change amount of velocity is smaller than the first threshold $D_{th1}$, the command circuit 16 determines that an adjustment signal requires no changes and does not operate the adjusting signal generation circuit 14. When the change amount of velocity is larger than the second threshold $D_{th2}$, the command circuit 16 determines that another adjustment signal is required and operates the adjusting signal generation circuit 14. FIG. 15A illustrates the operation and effects of the encoder signal processor according to the third example assumed when a change amount of velocity is disrupted by noise or other disturbances. FIG. 15B illustrates the operation and effects of the encoder signal processor according to the third example assumed when a change amount of velocity has increased due to secular changes of the encoder. As illustrated in FIG. 15A, when a change amount of velocity has temporarily varied due to a disturbance such as an external noise while the change amount of velocity is converging to a minimum value due to operation of the adjusting signal generation circuit 14 it may take time to obtain an adjusting signal that will minimize the change amount of velocity because of variations in the change amount of velocity. To address this problem, a first threshold $D_{th1}$ is predefined. When the change amount of velocity is smaller than the first threshold $D_{th1}$, generation of a provisional adjusting signal by the adjusting signal generation circuit 14 is terminated and then the provisional adjusting signal is confirmed as an adjusting signal. As illustrated in FIG. 15B, a change amount of velocity may increase due to secular changes of an encoder after setting of an adjustment signal by the adjusting signal generation circuit 14 is complete, resulting in a need for another adjusting signal. To address this problem, a second threshold $D_{th2}$ is predefined. When the change amount of velocity is larger than the second threshold $D_{th2}$, the adjusting signal generation circuit 14 is commanded to start generation of an adjusting signal. The command circuit 16 is constantly monitoring a change amount of velocity detected by the velocity change amount detection circuit. When the change amount of velocity exceeds the second threshold $D_{th2}$, the command circuit 16 commands the adjusting signal generation circuit 14 to start generation of an adjusting signal. This configuration allows an adjusting signal used by the analog signal adjustment circuit 11 to be automatically updated to an optimum value, which attains high-accuracy position detection in the presence of secular changes of an analog signal waveform outputted from an encoder.

The above first threshold $D_{th1}$ and the second threshold $D_{th2}$ may be configured to be arbitrarily specified by the user via a user interface such as a PC. This allows the position detection accuracy to be adjusted. For example, a first threshold $D_{th1}$ and a second threshold $D_{th2}$ may be written into a memory in an encoder other than a storage circuit 15 via a user interface and the thresholds $D_{th1}$ and a second threshold $D_{th2}$ may be loaded into a work area of an arithmetic processor in the encoder signal processor 1 when the encoder signal processor 1 starts operation.

Figure 16:
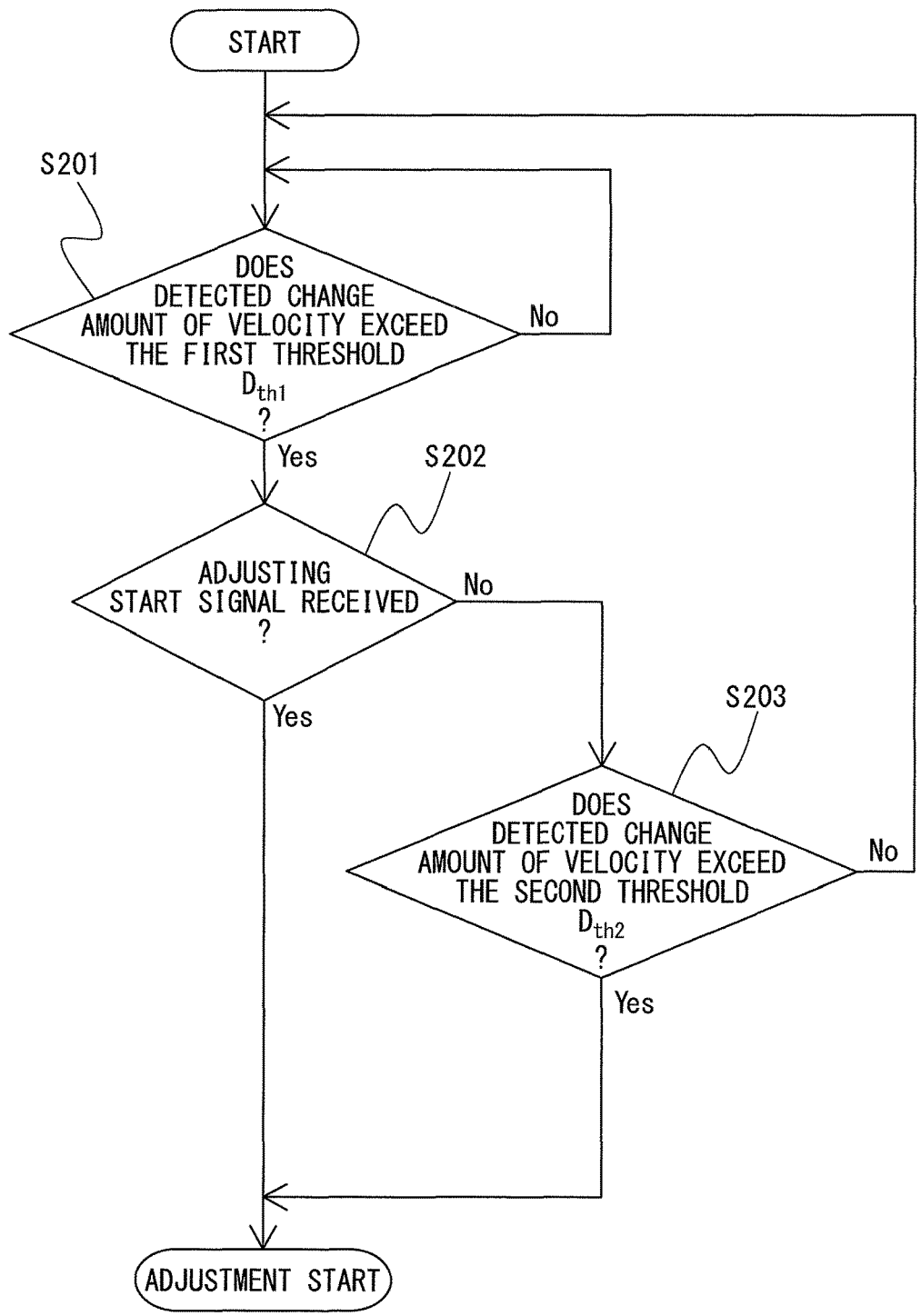
FIG. 16 is a flowchart explaining a command to start generation of an adjusting signal in the encoder signal processor according to the third example.

Next, a variant of the third example is described below. FIG. 16 is a flowchart explaining a command to start generation of an adjusting signal in the encoder signal processor according to the third example. In the third example described above, the command circuit 16 commands the adjusting signal generation circuit 14 to start generation of an adjusting signal when the change amount of velocity detected by the velocity change amount detection circuit 13 is larger than the second threshold $D_{th2}$. The variant of the third example further includes a case, as an additional condition for commanding the adjusting signal generation circuit 14 to start generation of an adjusting signal, where a change amount of velocity detected by the velocity change amount detection circuit 13 is larger than the first threshold $D_{th1}$ and an adjusting start signal is received from the outside, as well as the case where the change amount of velocity detected by the velocity change amount detection circuit 13 is larger than the second threshold $D_{th2}$ as in the third example. As illustrated in FIG. 16, the command circuit 16 is constantly monitoring a change amount of velocity detected by the velocity change amount detection circuit 13. In step S201, the command circuit 16 determines whether the change amount of velocity detected by the velocity change amount detection circuit 13 is larger than the first threshold $D_{th1}$. When the detected change amount of velocity is larger than the first threshold $D_{th1}$, the control proceeds to step S202. In step S202, the command circuit 16 determines whether an adjusting start signal is received from the outside. When the command circuit 16 has determined in step S202 that an adjusting start signal is received from the outside, the command circuit 16 commands the adjusting signal generation circuit 14 to start generation of an adjusting signal. When the command circuit 16 has determined in step S202 that an adjusting start signal is not received from the outside, the control proceeds to step S203. In step S203, the command circuit 16 determines whether a change amount of velocity detected by the velocity change amount detection circuit 13 is larger than the second threshold $D_{th2}$. When the command circuit 16 has determined that the change amount of velocity detected by the velocity change amount detection circuit 13 is larger than the second threshold $D_{th2}$, the command circuit 16 commands the adjusting signal generation circuit 14 to start generation of an adjusting signal. When the command circuit 16 has determined that the change amount of velocity detected by the velocity change amount detection circuit 13 is smaller than the second threshold $D_{th2}$, the command circuit 16 does not command the adjusting signal generation circuit 14 to start generation of an adjusting signal, and the control returns to step S201. With the variant of the third example, adjustment can be started also when an adjusting start signal is received from the outside of the encoder, e.g., from a numerical value controller or a PC. It is thus possible to set an adjusting signal used by the analog signal adjustment circuit 11 also in the manufacturing process of an encoder. Alternatively, the user may set an adjusting signal used by the analog signal adjustment circuit 11 with an arbitrary timing irrespective of whether the position detection accuracy has dropped.

Figure 17:
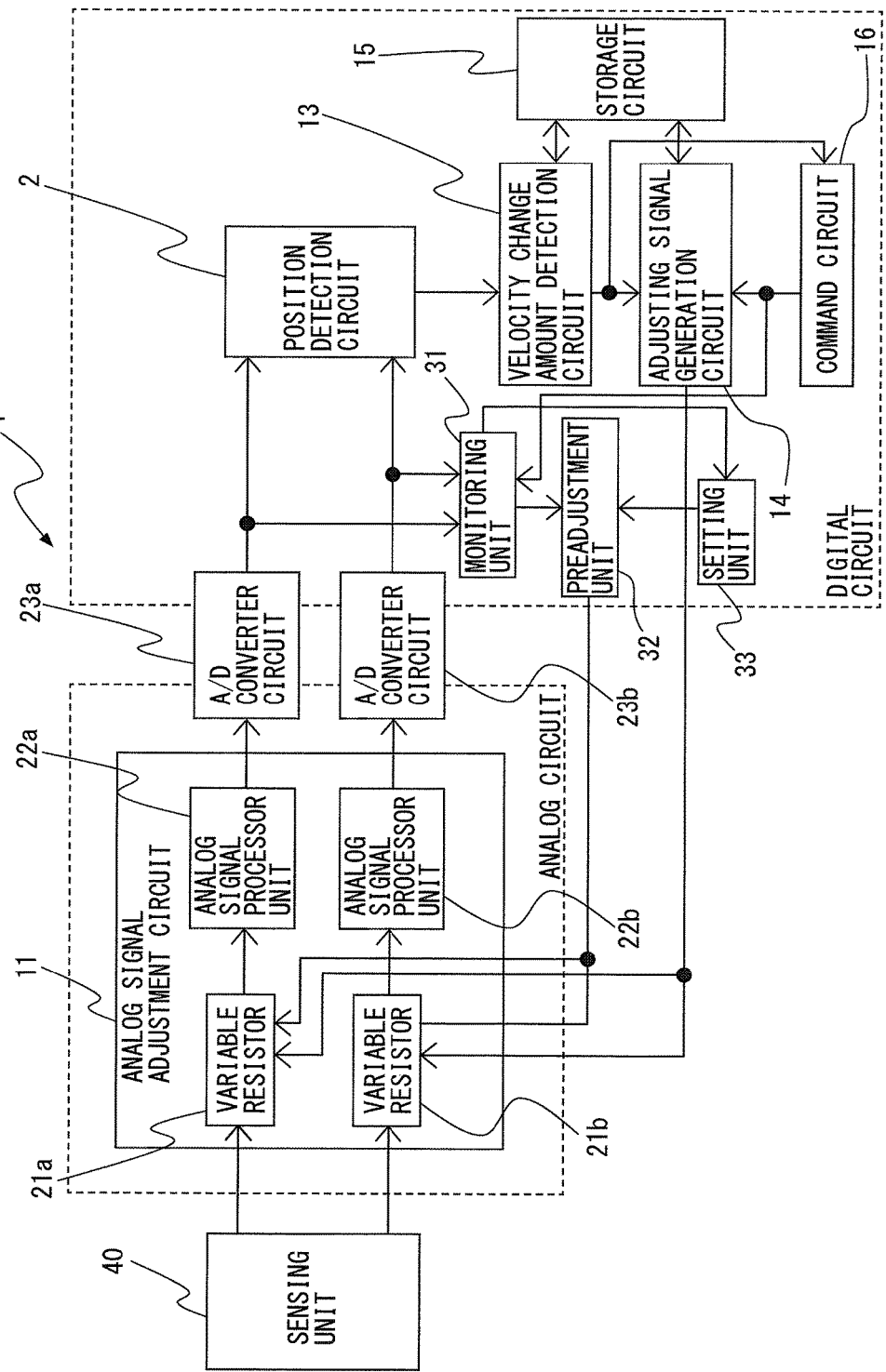
FIG. 17 is a principle block diagram of an encoder signal processor according to a fourth example.

Next, an encoder signal processor according to a fourth example is described below. FIG. 17 is a principle block diagram of an encoder signal processor according to the fourth example. The fourth example includes a monitoring unit 31, a preadjustment unit 32 and a setting unit 33 besides the encoder signal processor 1 according to the third example. Components except the monitoring unit 31, the preadjustment unit 32 and the setting unit 33 are the same as those used in the third example. The same signs are assigned to the same circuit components and detailed description is omitted. The variant of the first example and the variant of the third example described above are also applicable to the fourth example.

Imagine a case where an amplitude or an offset of a sinusoidal analog signal with two phases having a 90-degree difference outputted in accordance with to a travel of a target to be measured is substantially shifted from an optimum value before the adjusting signal generation circuit 14 starts generation of an adjusting signal. Even when the adjusting signal generation circuit 14 has started generation of an adjustment signal, it may take considerable time before an adjustment signal that will minimize the change amount of velocity is generated. Or, when an analog signal is adjusted using the generated adjusting signal by the analog signal adjustment circuit 11, an amplitude error or an offset may fail to disappear completely, resulting in convergence to an unexpected value. The fourth example further includes the monitoring unit 31, the preadjustment unit 32 and the setting unit 33 and performs rough adjustment in advance by preciously changing the resistance value of the variable resistors 21a and 21b by a predetermined amount without immediately starting generation of an adjusting signal by the adjusting signal generation circuit 14 when a command to start generation of an adjusting signal is received from the commanding circuit 16. the monitoring unit 31, the preadjustment unit 32 and the setting unit 33 are configured as digital circuits for performing arithmetic processing of digital signals, as with the position detection circuit 12, the velocity change amount detection circuit 13, the adjusting signal generation circuit 14, the storage circuit 15, and the command circuit 16.

The monitoring unit 31 monitors whether a monitoring target value as at least one of an offset and an amplitude of an analog signal adjusted by the analog signal adjustment circuit 11 drops below a predefined third threshold or exceeds a fourth threshold that is larger than the third threshold, in a time interval after a command to start generation of an adjusting signal is received from the command circuit 16 until the adjusting signal generation circuit 14 is commanded to start generation of an adjusting signal. It is assumed that the fourth threshold is larger than the third threshold. While the monitoring target value is at least one of an offset and an amplitude of an analog signal adjusted by the analog signal adjustment circuit 11, the monitoring unit 31 is configured as a digital circuit and monitors data from a digital signal converted from the analog signal by A/D converter circuits 23a and 23b.

When the monitoring target value has dropped below the third threshold, i.e., the lower limit value, the preadjustment unit 32 transmits to the variable resistor 21a or 21b a signal for adjusting the resistance value by a predetermined amount to cause the monitoring target value to increase until the monitoring target value exceeds the third threshold. When the monitoring target value has exceeded the fourth threshold, i.e., the upper limit value, the preadjustment unit 32 transmits to the variable resistor 21a or 21b a signal for adjusting the resistance value by a predetermined amount to cause the monitoring target value to decrease until the monitoring target value drops below the fourth threshold.

When the monitoring target value has dropped below the third threshold or has exceeded the fourth threshold, the setting unit 33 sets as a new predetermined value to be used by the preadjustment unit 32 a value smaller than the predetermined value used for adjustment of the monitoring target value.

When the monitoring target value has settled between the third threshold as a lower limit value and the fourth threshold as an upper limit value, the command circuit 16 commands starting generation of an adjusting signal. When the monitoring target value has already settled between the third threshold and the fourth threshold in a time interval after a command to start generation of an adjusting signal is received from the command circuit 16 until the adjusting signal generation circuit 14 is commanded to start generation of an adjusting signal, the preadjustment unit 32 does not operate. The adjusting signal generation circuit 14 starts generation of an adjusting signal in accordance with the command from the command circuit 16.

Figure 18A:
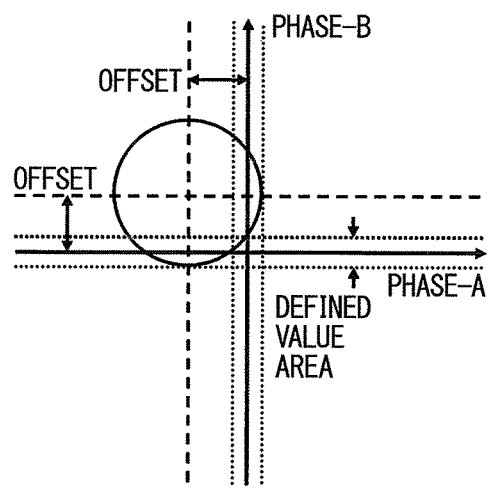
FIG. 18A is a Lissajous diagram illustrating an offset of an analog signal before preadjustment in the encoder signal processor according to the fourth example.
Figure 18B:
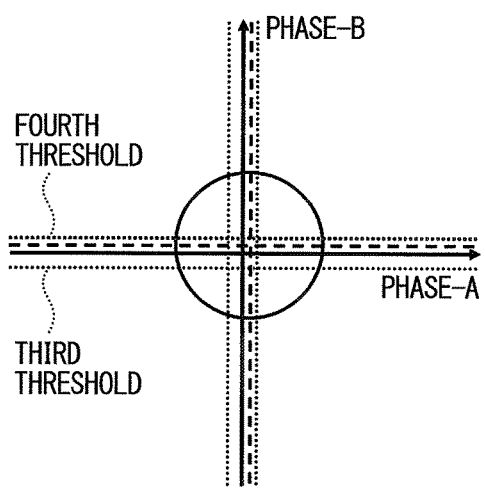
FIG. 18B is a Lissajous diagram illustrating an offset of an analog signal after preadjustment in the encoder signal processor according to the fourth example.

FIG. 18A is a Lissajous diagram illustrating an offset of an analog signal before preadjustment in the encoder signal processor according to the fourth example. FIG. 18B is a Lissajous diagram illustrating an offset of an analog signal after preadjustment in the encoder signal processor according to the fourth example. A third threshold as a lower limit value and a fourth threshold as an upper limit value are prespecified in a preadjustment process for an offset of an analog signal. Each of the third threshold and the fourth threshold may be set to a value that will not result in convergence to an unexpected value without an amplitude error or an offset being completely removed and that will require acceptable processing time in an adjustment signal generation process by the adjusting signal generation circuit 14. For example, the following field experiment may be conducted: 1) Cause a target to be measured to travel at a constant velocity; 2) Operate an encoder signal processor 1 while the target to be measured is traveling at a constant velocity. Setting may be based on the result of the experiment and the encoder operation. With reference to FIG. 18A, imagine that a large offset appears on a signal observed by the monitoring unit 31, the signal representing data of a digital signal converted by the A/D signal converter circuits 23a and 23b from an analog signal adjusted by the analog signal adjustment circuit 11, in a time interval after a command to start generation of an adjusting signal is received from the command circuit 16 until the adjusting signal generation circuit 14 is commanded to start generation of an adjusting signal. In this case, a signal to change the resistance value by a predetermined amount is transmitted to the variable resistors 21a and 21b until the monitoring target value settles within a value area defined by the third threshold and the fourth threshold, as illustrated in FIG. 18B.

Figure 19A:
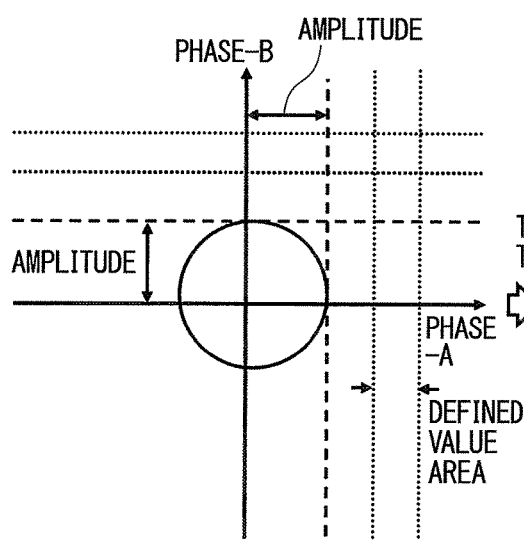
FIG. 19A is a Lissajous diagram illustrating an amplitude of an analog signal before preadjustment in the encoder signal processor according to the fourth example.
Figure 19B:
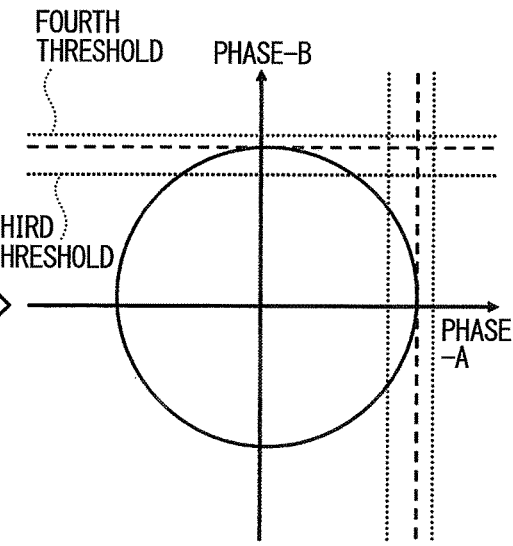
FIG. 19B is a Lissajous diagram illustrating an amplitude of an analog signal after preadjustment in the encoder signal processor according to the fourth example.
Figure 20:
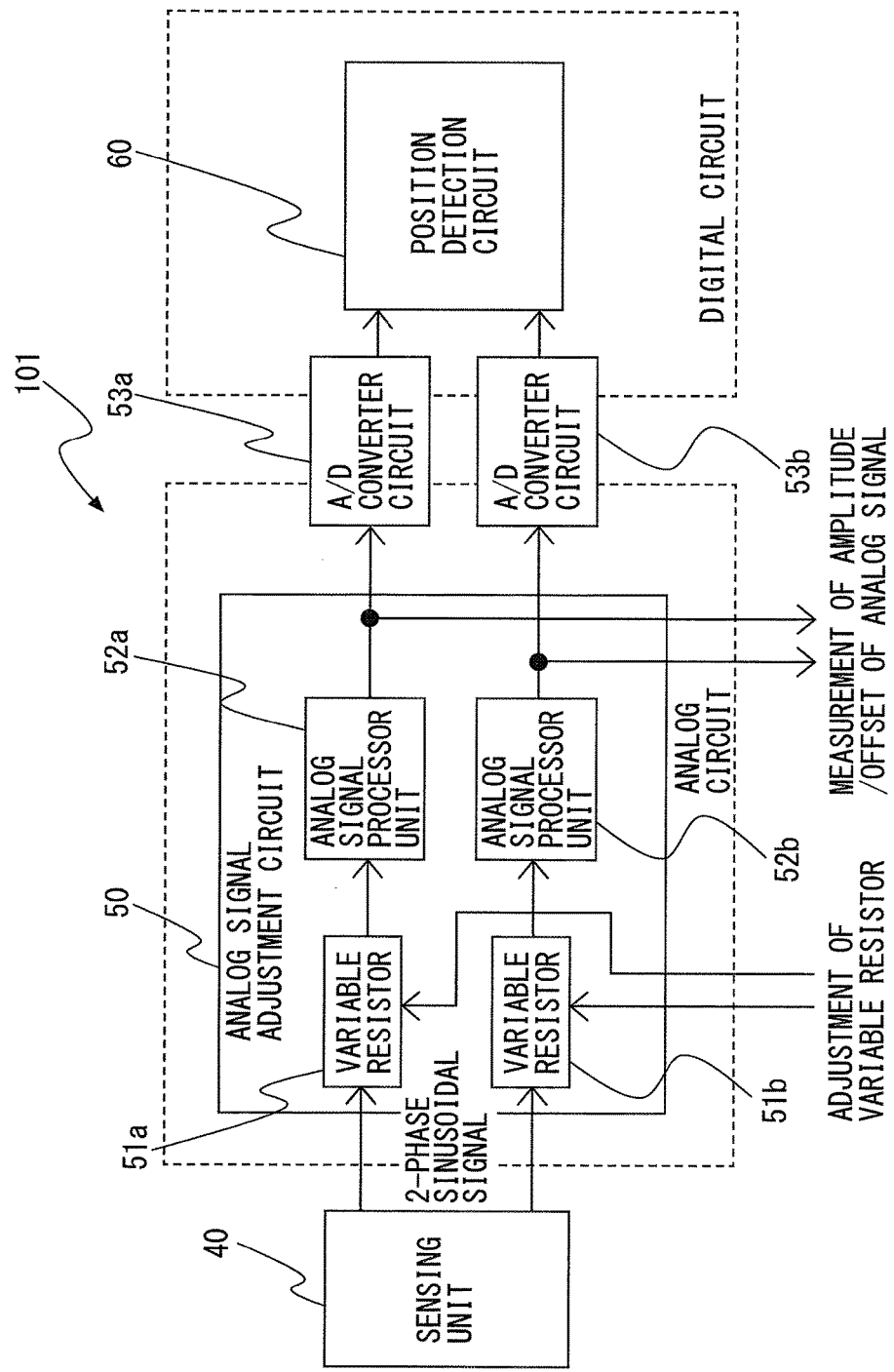
FIG. 20 is a block diagram illustrating a general-purpose encoder signal processor.
Figure 21:
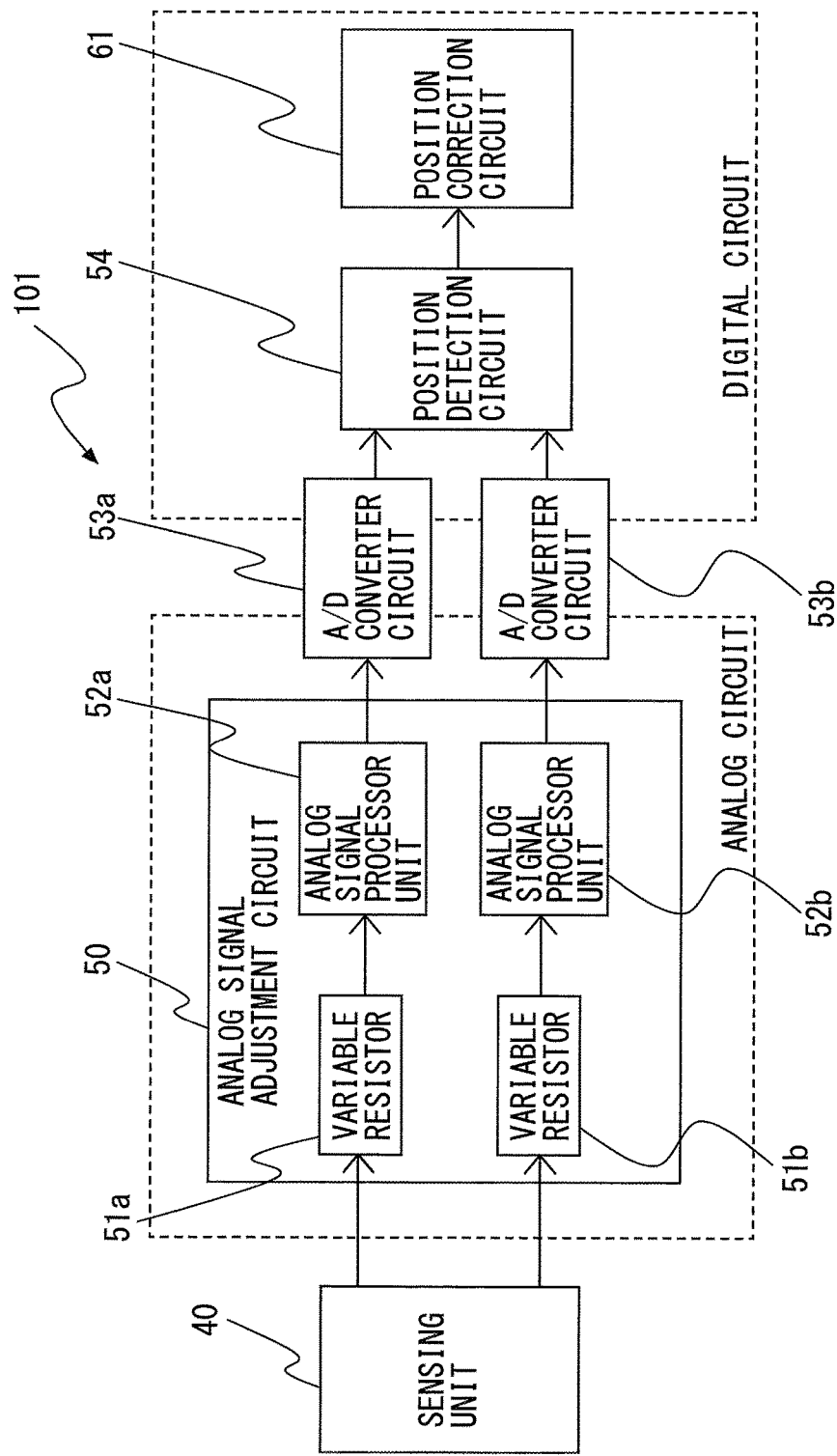
FIG. 21 is a block diagram illustrating a general-purpose encoder signal processor disclosed in the Japanese Unexamined Patent Publication No. 2003-254785.

FIG. 19A is a Lissajous diagram illustrating an amplitude of an analog signal before preadjustment in the encoder signal processor according to the fourth example. FIG. 19B is a Lissajous diagram illustrating an amplitude of an analog signal after preadjustment in the encoder signal processor according to the fourth example. A third threshold as a lower limit value and a fourth threshold as an upper limit value are prespecified in a preadjustment process for an amplitude of an analog signal. Each of the third threshold and the fourth threshold may be set to a value that will not result in convergence to an unexpected value without an amplitude error or an offset being completely removed and that will require acceptable processing time in an adjustment signal generation process by the adjusting signal generation circuit 14. For example, the following field experiment may be conducted: 1) Cause a target to be measured to travel at a constant velocity; 2) Operate an encoder signal processor 1 while the target to be measured is traveling at a constant velocity. Setting may be based on the result of the experiment and the encoder operation. With reference to FIG. 19A, imagine that the level of a signal is too low that is observed by the monitoring unit 31, the signal representing data of a digital signal converted by the A/D signal converter circuits 23a and 23b from an analog signal adjusted by the analog signal adjustment circuit 11, in a time interval after a command to start generation of an adjusting signal is received from the command circuit 16 until the adjusting signal generation circuit 14 is commanded to start generation of an adjusting signal. In this case, a signal to change the resistance value by a predetermined amount is transmitted to the variable resistors 21a and 21b until the monitoring target value settles within a value area defined by the third threshold and the fourth threshold, as illustrated in FIG. 19B.

The invention provides an encoder signal processor capable of performing high-accuracy position detection in the presence of secular changes of an analog signal waveform outputted from an encoder.

With the invention, an adjusting signal is generated that minimizes a change amount of velocity of position data of a target to be measured, the change amount detected based on a sinusoidal analog signal with two phases having a 90-degree difference, outputted in accordance with a travel of the target to be measured and analog signal adjustment is performed based on the adjusting signal. It is thus possible to performing high-accuracy position detection in the presence of a drop in an amplitude or a change in an offset of an analog input signal due to secular changes of an analog signal waveform outputted from an encoder.

The invention includes a command circuit that is constantly monitoring a change amount and commands start of generation of an adjusting signal when the change amount has exceeded a predetermined threshold. It is thus possible to automatically update an adjusting signal used for analog signal adjustment. It is made possible to perform high-accuracy position detection in the presence of secular changes of an analog signal waveform outputted from an encoder.

With the invention, there is specified a cycle of detecting a change amount of velocity used for generation of an adjusting signal to an integral multiple of the cycle of a sinusoidal analog signal with two phases having a 90-degree difference, outputted in accordance with a travel of a target to be measured. Via this design, it is possible to simplify a signal determination logic in an adjusting signal generation circuit.

With the invention, an adjusting signal for one of the phases is transmitted while an amplitude of the other phase is in the vicinity of zero. This prevents disturbances in the processing in the encoder signal processor 1 even while the encoder is rotating.

With the invention, all components for adjusting an analog signal waveform are assembled into an encoder. This downsizes encoder manufacturing equipment.

In the prior art, a cover of an encoder was opened and a mechanical volume knob therein was manipulated to adjust a resistance value of an analog variable resister used to adjust an offset and an amplitude of an analog signal outputted from an encoder. With the invention, an electronic variable resistor may be used in an analog signal adjustment circuit. Its resistance value is adjusted based on an adjusting signal or a provisional adjusting signal received. This design prevents intrusion of dust or dirt into an encoder. It is possible to reduce man-hours necessary for manufacturing encoders thereby reducing the overall manufacturing cost of encoders.

What is claimed is:

1. An encoder signal processor comprising:
   an analog signal adjustment circuit including at least two variable resistors for adjusting, based on an adjusting signal received from a sensor, at least one of an offset and an amplitude of a sinusoidal analog signal with two phases having a 90-degree difference outputted in accordance with a rotation of a target measured by the sensor;
   a processor:
   calculating position data of a target to be measured based on a digital signal obtained through analog/digital conversion of an analog signal adjusted by the analog signal adjustment circuit;
   detecting a change amount of velocity per predetermined detection cycle from a velocity calculated based on position data while a target to be measured is rotating at a constant velocity; and
   generating an adjusting signal and transmitting the adjusting signal to the analog signal adjustment circuit to increase and decrease a resistance value of at least one of the at least two variable resistors such that the resistance value minimizes the change amount of velocity by forcing the change amount of velocity to converge to a value by repeatedly:
   1) increasing the resistance value in a subsequent detection cycle by adding a predetermined shift amount to the resistance value when the change amount of velocity is detected to be smaller than the change amount of velocity detected in a preceding detection cycle, and
   2) decreasing the resistance value in the subsequent detection cycle by subtracting the predetermined shift amount from the resistance value when the change amount of velocity is detected to be larger than the change amount of velocity detected in the preceding detection cycle.

2. The encoder signal processor according to claim 1, wherein the at least two variable resistors each have a resistance value that is adjusted to converge to a resistance value specified by an adjusting signal or a provisional adjusting signal received, and wherein in conjunction with the adjustment of the resistance value of the at least two variable resistors, at least one of an offset and an amplitude of a sinusoidal analog signal are adjusted with two phases having a 90-degree difference.

3. The encoder signal processor according to claim 2, wherein the at least two variable resistors are individually provided to adjust each of an offset and an amplitude of a single-phase sinusoidal analog signal with one of the two phases having a 90-degree difference of a two-phase sinusoidal analog signal, and wherein the adjusting signal and the provisional adjusting signal specify the at least two variable resistors to be adjusted and the target resistance value of the at least two variable resistors.

4. The encoder processor according to claim 3, wherein the adjusting signal generation circuit comprises: a velocity change amount comparison unit for comparing a change amount of velocity detected by the velocity change amount detection circuit with a change amount of velocity detected in a first preceding detection cycle of detection of the change amount of velocity;

a provisional adjusting signal determination unit for determining a provisional adjusting signal based on the change amount of velocity detected by the velocity change amount detection circuit in the detection cycle and transmitting the provisional adjusting signal to the analog signal adjustment circuit, wherein when the velocity change amount comparison unit has determined that the change amount of velocity detected by the velocity change amount detection circuit is smaller than the change amount of velocity detected in a first preceding detection cycle, the provisional adjusting signal determination unit adds the same shift amount as that used for determination of the provisional adjusting signal in the first preceding detection cycle to a resistance value specified by the provisional adjusting signal in the first preceding detection cycle and transmits the resulting signal as a provisional adjusting signal in the current detection cycle to the analog signal adjustment circuit, and wherein when the velocity change amount comparison unit has determined that the change amount of velocity detected by the velocity change amount detection circuit is larger than the change amount of velocity detected in a first preceding detection cycle, the provisional adjusting signal determination unit subtracts the same shift amount as that used for determination of the provisional adjusting signal in the first preceding detection cycle from the resistance value specified by the provisional adjusting signal in the first preceding detection cycle, adds a shift amount different from the shift amount and transmits the resulting signal as a provisional adjusting signal in the current detection cycle to the analog signal adjustment circuit, or transmits an adjusting signal in which a variable resistor of the at least two to be adjusted is changed to the analog signal adjustment circuit; and an adjustment signal confirmation unit for confirming as an adjusting signal a provisional adjusting signal transmitted from the provisional adjusting signal determination unit to the analog signal adjustment circuit when the change amount of velocity detected by the velocity change amount detection circuit has converged to a predetermined value.

5. The encoder signal processor according to claim 4, further comprising: a storage circuit including a first storage area for storing a set of the change amount of velocity detected by the velocity change amount detection circuit and the provisional adjusting signal transmitted to the analog signal adjustment circuit when the change amount of velocity was detected; and a second storage area for storing a predefined provisional adjusting signal as a candidate to be transmitted to the analog signal adjustment circuit; wherein the velocity change amount comparison unit compares the change amount of velocity detected by the velocity change amount detection circuit with the change amount of velocity stored in the first storage area, the change amount of velocity detected in a first preceding detection cycle of detection of the change amount of velocity, wherein when the velocity change amount comparison unit has determined that the change amount of velocity detected by the velocity change amount detection circuit is smaller than the change amount of velocity detected in the first preceding detection cycle, the provisional adjusting signal determination unit transmits to the analog signal adjustment circuit a provisional adjusting signal stored in the second storage area specifying the resistance value adjusted by the same change amount as that of the resistance value between the provisional adjusting signal in a second preceding detection cycle and the provisional adjusting signal in the first preceding detection cycle stored in the first storage area, and wherein when the velocity change amount comparison unit has determined that the change amount of velocity detected by the velocity change amount detection circuit is larger than the change amount of velocity detected in the first preceding detection cycle, the provisional adjusting signal determination unit transmits to the analog signal adjustment circuit a provisional adjusting signal in the second storage area specifying a change amount different from the change amount of the resistance value between the provisional adjusting signal in a second preceding detection cycle and the provisional adjusting signal in the first preceding detection cycle stored in the first storage area.

6. The encoder signal processor according to claim 4, wherein when the amplitude of an analog signal with one of the two phases having a 90-degree difference of a two-phase sinusoidal analog signal is in the vicinity of zero, the adjusting signal generation circuit generates a provisional adjusting signal for adjusting at least one of an offset and an amplitude of an analog signal with the other phase and transmits the provisional adjusting signal to the analog signal adjustment circuit.

7. The encoder signal processor according to claim 2, further comprising a command circuit for commanding the adjusting signal generation circuit to stop generation of an adjusting signal when the change amount of velocity detected by the velocity change amount detection circuit is smaller than a first predefined threshold, and for commanding the adjusting signal generation circuit to start generation of an adjusting signal when the change amount of velocity detected by the velocity change amount detection circuit is larger than a second threshold exceeding the first predefined threshold.

8. The encoder signal processor according to claim 7, wherein the command circuit commands the adjusting signal generation circuit to start generation of an adjusting signal when the change amount of velocity detected by the velocity change amount detection circuit is larger than the first threshold and an adjusting start signal is received from the outside or when the change amount of velocity detected by the velocity change amount detection circuit is larger than the second threshold.

9. The encoder signal processor according to claim 7, further comprising: a monitoring unit for monitoring whether a monitoring target value as at least one of an offset and an amplitude of an analog signal adjusted by the analog signal adjustment circuit drops below a predefined third threshold or exceeds a fourth threshold that is larger than the third threshold, in a time interval after a command to start generation of an adjusting signal is received from the command circuit until the adjusting signal generation circuit is commanded to start generation of an adjusting signal;
  a preadjustment unit for transmitting to a variable resistor of the at least two variable resistors a signal for adjusting the resistance value by a predetermined amount to cause the monitoring target value to increase until the monitoring target value exceeds the third threshold when the monitoring target value has dropped below the third threshold and for transmitting to the variable resistor of the at least two variable resistors a signal for adjusting the resistance value by a predetermined amount to cause the monitoring target value to decrease until it drops below the fourth threshold when the monitoring target value has exceeded the fourth threshold; and
  a setting unit for setting, as a new predetermined amount used by the preadjustment unit, a value smaller than the predetermined amount used to adjust the monitoring target value each time the monitoring target value has dropped below the third threshold or has exceeded the fourth threshold; wherein
  the command circuit commands starting generation of an adjusting signal when the monitoring target value has settled between the third threshold and the fourth threshold.

10. The encoder signal processor according to claim 1, wherein the velocity change amount detection circuit comprises:
  a velocity calculation unit for calculating a velocity V(m) based on $$V(m) = \frac{X(m) - X(m-1)}{\Delta t}$$

an acceleration calculation unit for calculating an acceleration A(m) based on $$A(m) = \frac{V(m) - V(m-1)}{\Delta t}$$

given that, while a target to be measured is traveling at a constant velocity, the position of the target to be measured as detected by a position detection circuit with a certain detection timing m is X(m), the position of the target to be measured as detected with a detection timing m−1 immediately preceding the detection timing is X(m−1), and a position detection cycle is Δt; and
  a change amount calculation unit for calculating a change amount of velocity $D_A$ based on $$D_A = \sum_{k=p}^{q} |A(k)|$$

where p≤q,
  given that detection timings for defining a predetermined detection cycle larger than the position detection cycle Δt are p and q (where p≤q).

11. The encoder signal processor according to claim 1, comprising: The predetermined detection cycle may be an integral multiple of the cycle of a sinusoidal analog signal with two phases having a 90-degree difference.

* * * * *